United States Patent
Hofer

(10) Patent No.: US 10,893,201 B2
(45) Date of Patent: Jan. 12, 2021

(54) VIDEO STABILIZATION METHOD WITH NON-LINEAR FRAME MOTION CORRECTION IN THREE AXES

(71) Applicant: PELCO, Inc., Andover, MA (US)

(72) Inventor: Gregory V. Hofer, Loveland, CO (US)

(73) Assignee: PELCO, INC., Fresno, CA (US)

( * ) Notice: Subject to any disclaimer, the term of this patent is extended or adjusted under 35 U.S.C. 154(b) by 0 days.

(21) Appl. No.: 16/414,369

(22) Filed: May 16, 2019

(65) Prior Publication Data

US 2020/0366824 A1  Nov. 19, 2020

(51) Int. Cl.
*H04N 5/232* (2006.01)
(52) U.S. Cl.
CPC ....... *H04N 5/2329* (2013.01); *H04N 5/23267* (2013.01)
(58) Field of Classification Search
CPC .................................................. H04N 5/2329
USPC ...................................................... 348/208.6
See application file for complete search history.

(56) References Cited

U.S. PATENT DOCUMENTS

2005/0122403 A1\* 6/2005 Yoneda .............. H04N 5/23274
348/208.6
2014/0218569 A1  8/2014 Tsubaki
2016/0006935 A1  1/2016 Zhou et al.
2019/0080181 A1  3/2019 Ermilios et al.
2019/0089888 A1  3/2019 Berberian

FOREIGN PATENT DOCUMENTS

JP  2016-066848 A  4/2016

OTHER PUBLICATIONS

International Search Report issued in application No. PCT/US20/32775 dated Aug. 26, 2020, pp. 3.

\* cited by examiner

*Primary Examiner* — Joel W Fosselman
(74) *Attorney, Agent, or Firm* — Tutunjian & Bitetto, P.C.

(57) ABSTRACT

A method and system are provided to perform electronic image stabilization of images captured by an image sensor on a camera device. In the method and system, non-linear motion of a camera device is measured with a motion sensor during an exposure time for each line of a frame captured by the image sensor of the camera device. A first line of the frame has a first exposure time, and subsequent lines of the frame have an exposure time that is later than a previous line of the frame, each line of the frame having an associated position in the frame. The position of each line of the frame is adjusted based, at least in part, on the measured non-linear motion to create a modified frame that corrects for non-linear motion that occurred for each line of the frame.

52 Claims, 11 Drawing Sheets

VIDEO STABILIZATION METHOD WITH NON-LINEAR FRAME MOTION CORRECTION IN THREE AXES

FIELD

This disclosure relates generally to camera devices, and more particularly, to systems and methods related to electronic image stabilization (EIS) using non-linear frame motion correction to correct for rolling shutter artifacts.

BACKGROUND

Cameras are used in a variety of applications. One example application is in surveillance applications in which cameras are used to monitor indoor and outdoor locations. Networks of cameras may be used to monitor a given area, such as the internal and external portion (e.g., a room, or entrance) of a commercial building. Cameras can employ an image sensor, such as a CMOS image sensor, which can use a rolling shutter readout. The exposure time for each line of this type of rolling-shutter sensor configuration occurs at a slightly different time such that a first line of a frame is exposed first followed by successive lines that are each exposed slightly later than the previous line in the frame. Since varying amounts of non-linear motion can occur during one frame time, the camera position can be different during the exposure time for each line in the frame, thereby resulting in undesirable artifacts in the video image.

SUMMARY

Described herein are systems and methods related to electronic image stabilization (EIS) to correct for rolling shutter artifacts that arise from non-linear motion within each frame time, such as for a video stream captured by a camera device. The EIS correction can eliminate, among other things, rolling shutter artifacts induced by motion along different axes of rotation, such as pitch, yaw and/or roll motion.

In various embodiments, methods and systems are provided to perform electronic image stabilization of images captured by an image sensor on a camera device. In the methods and systems, non-linear motion of a camera device is measured with a motion sensor during an exposure time for each line of a frame captured by the image sensor of the camera device. A first line of the frame has a first exposure time, and subsequent lines of the frame have an exposure time that is later than a previous line of the frame, each line of the frame having an associated position in the frame. The position of each line of the frame is adjusted based, at least in part, on the measured non-linear motion to create a modified frame that corrects for non-linear motion that occurred for each line of the frame.

In some embodiments, the position of each line is adjusted to create the modified frame that corrects for non-linear motion including at least pitch, yaw and/or roll motion. The frame can be one video frame of a video stream including a plurality of video frames, and the methods and systems described herein can repeat the measurement and adjustment operations for each video frame of the plurality of video frames.

In embodiments, to measure the non-linear motion of a camera device, the method and system can generate motion data indicative of the measured non-linear motion for each line which is readout from the image sensor for the frame; and store the motion data in association with line identification information indicative of a line number or order in the frame for each line of the frame.

In embodiments, the methods and systems disclosed herein can crop a region of the modified frame according to a crop region defined by a crop window, and output image data for the cropped region of the modified frame. In some embodiments, image data for a frame is stored in a frame buffer. The methods and systems disclosed herein can further monitor an average center pixel value of the crop window, and apply an offset value to the motion data for the lines of the frame in order to re-center the crop window relative to a center of the frame buffer when a position of the average center pixel value indicates that an edge of the crop window has moved closer to a position of an edge of the frame buffer.

In embodiments, image data of an uncorrected frame is stored in a frame buffer. The methods and systems disclosed herein can adjust the position of each line of the frame at least by taking uncorrected image data of the lines of the frame in the frame buffer and moving the uncorrected image data to a corrected position based on the motion data measured for the lines. In embodiments, the image data of the modified frame may be stored in a corrected frame buffer, and the uncorrected image data may be moved to a corrected position in the corrected frame buffer based on the motion data measured for the lines.

In embodiments, image data of an uncorrected frame is stored in a frame buffer. The methods and systems disclosed herein can adjust the position of each line of the frame by selecting a corrected buffer position, identifying at least one line from the uncorrected frame that has the same or equivalent position from the frame buffer based on the motion data measured for the lines of the frame, and filling the corrected frame position using image data associated with the identified at least one line. In embodiments, the image data of the modified frame may be stored in a corrected frame buffer, a corrected frame position may be selected in the corrected frame buffer, at least one line may be identified from the uncorrected frame that has the same or equivalent position from the uncorrected frame buffer based on the motion data measured for the lines of the frame, and the corrected frame position may be filled in the corrected frame buffer using image data associated with the identified at least one line.

In embodiments, for each line to be corrected from the captured frame, the methods and systems disclosed herein can adjust the position of each line of the frame by obtaining line information of one or more line numbers and motion data of at least one closest line matching the line to be corrected, fetching the at least one closest lines from a frame buffer to perform vertical correction, and shifting pixels in the at least one closest line to perform horizontal correction according to the motion data. In some embodiments, the at least one closest line can include two closest lines, which match the line to be corrected. The methods and systems disclosed herein can further interpolate the two closest lines with the shifted pixels to produce a single interpolated line for the modified frame.

In embodiments, the methods and systems disclosed herein can adjust the position of each line of the frame at least by mapping image data of the line to be corrected on the frame across multiple lines in the modified frame to correct for rotational motion measured by the motion sensor.

BRIEF DESCRIPTION OF THE DRAWINGS

The foregoing features of the present disclosure, as well as the present disclosure itself may be more fully understood from the following detailed description of the drawings, in which.

DETAILED DESCRIPTION

The features and other details of the concepts, systems, and techniques sought to be protected herein will now be more particularly described. It will be understood that any specific embodiments described herein are shown by way of illustration and not as limitations of the present disclosure and the concepts described herein. Features of the subject matter described herein can be employed in various embodiments without departing from the scope of the concepts sought to be protected.

Figure 1:
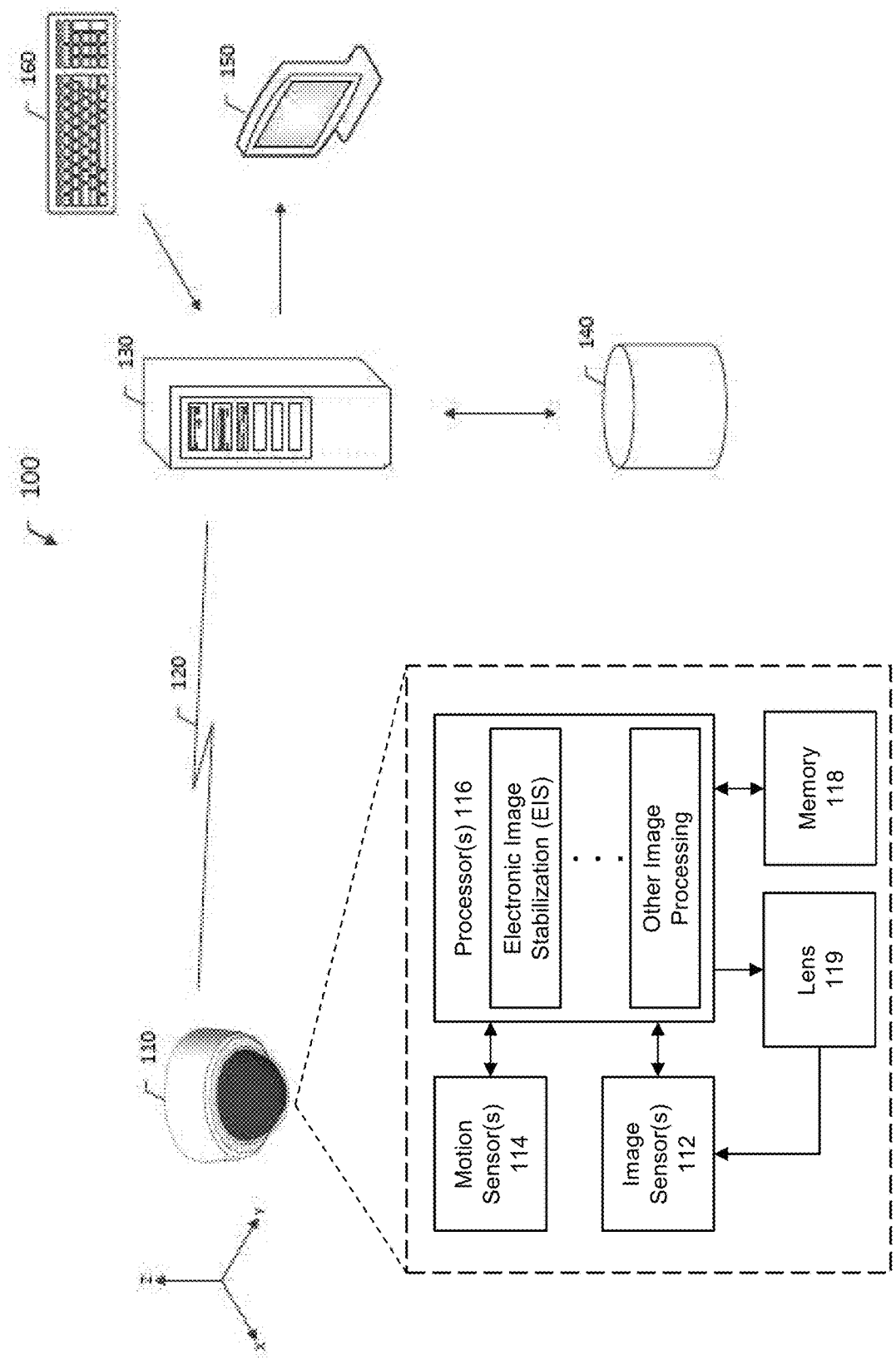
FIG. 1 shows an example video surveillance system that employs one or more camera devices in accordance with an embodiment of the present disclosure.

Referring to FIG. 1, an example video surveillance system 100 according to the present disclosure is shown including at least one camera device (or camera) 110 and at least one remote video management system (VMS) 130. The at least one camera 110 may be positioned to monitor one or more areas interior to or exterior from a building (e.g., a commercial building) or other structure to which the at least one camera 110 is coupled. Additionally, the at least one VMS 130 may be configured to receive video data from the at least one camera 110. In embodiments, the at least one camera 110 is communicatively coupled to the at least one VMS 130 through a communications network, such as, a local area network, a wide area network, a combination thereof, or the like. Additionally, in embodiments the at least one camera 110 is communicatively coupled to the at least one VMS 130 through a wired or wireless link, such as link 120 shown.

The VMS 130 is communicatively coupled to at least one memory device (or memory) 140 (e.g., a database) and to a remote display device 150 (e.g., a computer monitor) in the example embodiment shown. The at least one memory device 140 may be configured to store video data received from the at least one camera 110. Additionally, the VMS 130 may be configured to present select camera video data, and associated information, via the remote display device 150, for example, for viewing by a user (e.g., security personnel monitoring the building to which the at least one camera 110 is coupled). In embodiments, the VMS 130 and/or the remote display device 150 may be communicatively coupled to a user input device 160 (e.g., a keyboard). In embodiments, a user may select the camera video data to be presented on the remote display device 150 via the user input device. For example, the user may select a particular camera of the at least one camera 110 for which the user wants to view video data. Additionally, the user may select a particular area monitored by the video surveillance system 100 for which the user wants to view video data. For example, the particular area may correspond to an entrance of a building which the video surveillance system 100 is configured to monitor. In embodiments, the particular area may be monitored by one or more cameras of the at least one camera 110.

In some embodiments, the at least one memory device 140 is a memory device of the VMS 130. In other embodiments, the at least one memory device 140 is an external memory device, as shown. In some embodiments, the at least one memory device 140 includes a plurality of memory devices. For example, in some embodiments the at least one memory device 140 includes at least a first memory device and a second memory device. The first memory device may be configured to store a first portion of video data received from the at least one camera device 140, for example, a video stream of the video data. Additionally, the second memory device may be configured to store a second portion of video data received from the at least one camera device 140, for example, a metadata stream of the video data. In embodiments, the first and second memory devices are located at a same geographical location. Additionally, in embodiments the first and second memory devices are located at different geographical locations, for example, to provide an additional layer of security for the video data stored on the first and second memory devices.

The at least one VMS 130 to which the at least one memory device 140 is communicatively coupled may include a computer device, e.g., a personal computer, a laptop, a server, a tablet, a handheld device, etc., or a computing device having a processor and a memory with computer code instructions stored thereon. In embodiments, the computer or computing device may be a local device, for example, on the premises of the building which the at least one camera 110 is positioned to monitor, or a remote device, for example, a cloud-based device.

In embodiments, the at least one camera device 110 includes at least one image sensor(s) 112, at least one motion sensor(s) 114, at least one processor(s) 116, at least one memory (or memory device) 118 and at least one lens 119 (e.g., a lens system). In some embodiments, the camera device 110 is a video capture device or video camera. In some embodiments, the at least one camera device 110 is an IP camera.

The at least one image sensor 112 can capture still and video images using a rolling shutter architecture, or other shutter architecture which exposes, captures and readouts a frame on a line-by-line basis or in subsets of lines at a time. The image sensor 112 can be a CMOS image sensor or other image sensor suitable for use with such shutter architecture.

The at least one motion sensor 114 can measure (or detect) motion of the at least one camera 110, such as linear motion as well as non-linear motion of the camera device (and its components). In some embodiments, the non-linear motion includes pitch, yaw and/or roll motion of the camera device. In some embodiments, the at least one motion sensor(s) 114 may be a gyro, such as for example a two-axis gyro to detect yaw and pitch motion or a three-axis gyro to detect yaw, pitch and roll motion. The motion sensor(s) may be integrated into the camera device 110 or coupled to the camera device 110.

The at least one processor 116 (e.g., processing unit(s)) is configured to provide a number of functions. For example, the at least one processor 116 may perform electronic image stabilization (EIS) on image(s) captured by the at least one image sensor 112 to correct for artifacts resulting from camera motion, including but not limited to non-linear camera motion, detected by the at least one motion sensor 114 when exposing, capturing and reading out frames of images from the at least one image sensor 112. In some embodiments, the at least one processor 116 may perform EIS to correct the lines of each frame according to the non-linear motion (e.g., pitch/yaw, pitch/yaw/roll, etc.) measured by the at least one motion sensor 114. In some embodiments, EIS correction may be performed by taking a reading from the motion sensor 114 during the exposure time for each line and correcting the position of each line and creating a composite image using the corrected line information. This technique can be used to correct pitch, yaw, and/or roll motion as well as other camera motion when using a rolling shutter or other similar architecture on the at least one image sensor 112. Various embodiments of the EIS methods and processes will be described in further detail below.

The at least one processor 116 also may perform image processing, such as motion detection, on video streams captured by the at least one camera 110. In some embodiments, the at least one camera device 110 is configured to process a video stream captured by the at least one camera 110 on the at least one camera device 110 to identify one or more objects of interests (e.g., people) in the video stream. In other embodiments, the remote VMS 130 may be configured to identify the objects of interest. In embodiments, the objects of interest are user configured objects of interest.

The at least one memory 118 is configured to store data for use in the operation of the camera device and its components. The at least one memory 118 can store application or programs to control the operations of the processor 116 to perform the various functions described herein, image data including image or video data including line data for each frame, motion data measured for each line or subset of lines of each frame, correction or control parameters, and other data for use in implementing the EIS method and system described herein and other camera device operations. The at least one memory 118 may include one or more memory devices. In some embodiments, the video streams captured and corrected by the at least one camera device 110 for camera motion may be stored on the memory 118 associated with the at least one camera device 110 prior to, during and/or after the processing by the at least one camera 110. In some embodiments, the at least one memory 118 can include buffers, such as a frame buffer to store uncorrected frame data (e.g., data to be corrected or undergoing correction) and a corrected frame buffer to store processed and corrected frame data, a sample buffer to store motion data measured for each line or subset of lines for a captured frame, or other buffers such as described herein. In some embodiments, the memory 118 associated with the camera device 110 may be a memory device of the at least one camera 110 (e.g., EEPROM). In other embodiments, the memory device associated with the at least one camera 110 may be an external memory device (e.g., a microSDHC card). In some embodiments, the at least one memory 118 may be a standalone device, or incorporated in the components of the camera device 110 or a combination thereof.

Additional aspects of video surveillance systems, its camera device(s) 110 and EIS techniques in accordance with various embodiments of the present disclosure are discussed further in connection with Figures below.

Figure 2:
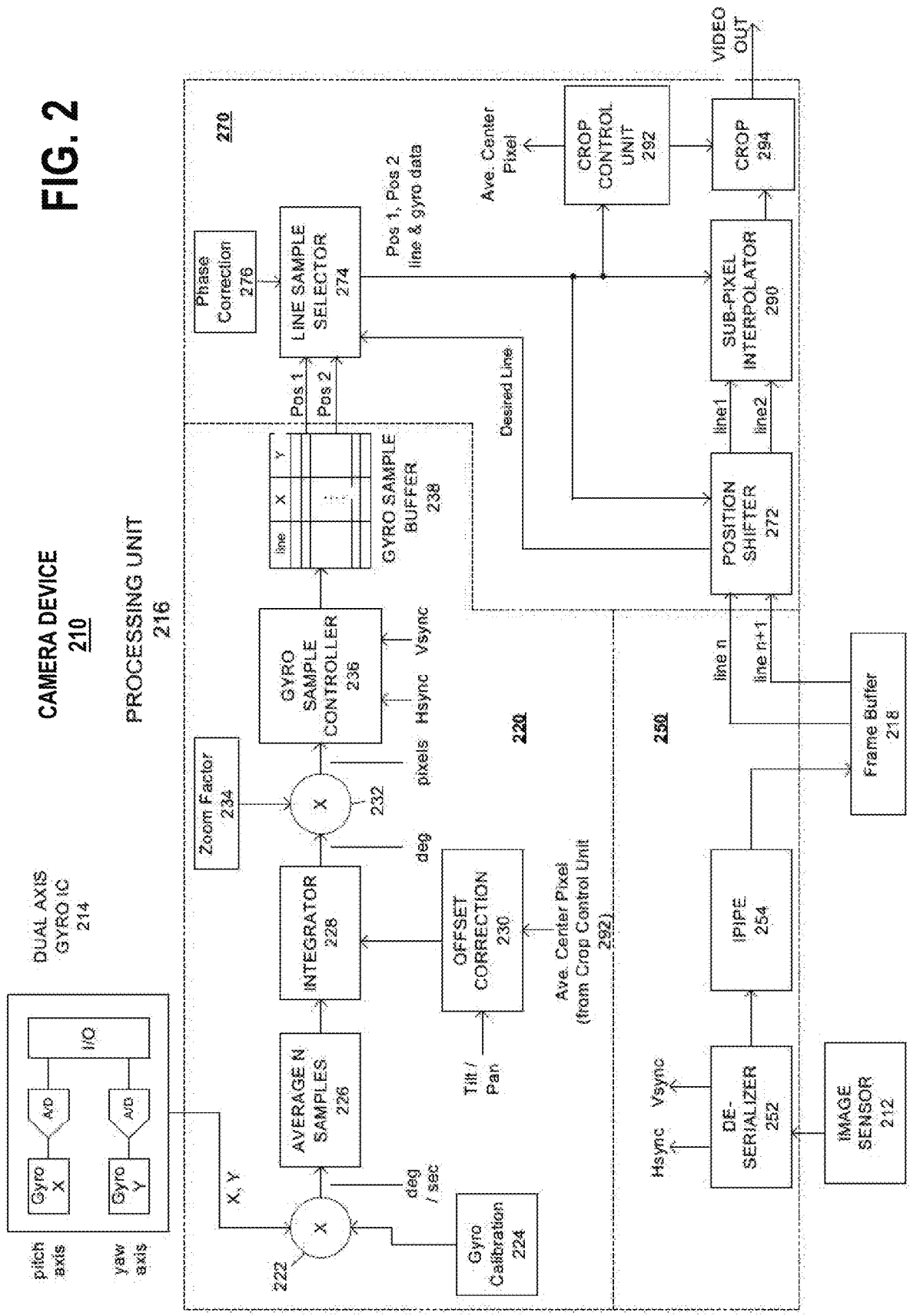
FIG. 2 shows a block diagram of example functional components of an electronic image stabilization system with at least two-axis motion correction for a camera device in accordance with an embodiment of the present disclosure.

FIG. 2 is a block diagram of functional components of an example electronic image stabilization system with at least two-axis motion correction for a camera device 210 in accordance with an embodiment of the present disclosure. In this example, the camera device 210 includes an image sensor(s) 212, a motion sensor(s) 214, a processor unit(s) (or processor(s)) 216, and a frame buffer(s) 218 and other buffers to store image data at various stages of the EIS correction processing.

The image sensor 212 is configured to capture frames of images, such as video frames of a video stream. In some embodiments, the image sensor 212 may be a CMOS image sensor, which utilizes a rolling shutter architecture to control the exposure, capture and readout of the lines of each frame. In some embodiments, the image sensor 212 can perform exposure and readout on a line-by-line basis or in subsets of lines-by-lines over time to produce a frame.

The motion sensor 214 is configured to measure at least non-linear motion of the camera device 210 and/or its components (e.g. the lens or image sensor module). In some embodiments, the motion sensor 214 may be a dual-axis gyro to measure and output motion data (or motion information) indicative of rotation about two axes, e.g., a pitch axis and a yaw axis, or a 3-axis gyro to measure and output motion data indicative of rotation about three axes, e.g., a pitch axis, a yaw axis and a roll axis. The motion sensor 214 can include a gyro to measure an angular velocity for each measurable axis, an analog-to-digital (A/D) converter to convert the motion data signal from the gyro to a digital motion data signal (or format), and a serial I/O interface to output the digital motion data signal into a serial data format.

In some embodiments, the motion sensor 214 may have gyros with performance characteristics sufficient to allow sampling a gyro reading during every line of a frame, including integrated programmable high pass and low pass filters to control the bandwidth. One potential issue with gyros is that the output may have an offset bias that may need to be corrected. However, since the absolute DC angular rate is not important, the gyro output can be effectively AC coupled to ignore such DC offset bias. The integrated high pass filter can be set to a non-zero frequency, e.g., 0.5 Hz, to accomplish this goal. The gyro may have a number of registers that control the sensitivity range, high pass (HP) and low pass (LP) filters, interrupt configuration, first-in-first-out or FIFO configuration, and sample rate. The I/O bus between a gyro and the processing unit (e.g., a FPGA or DSP) can be used to setup these registers when the hardware is initialized. The I/O bus is also used to transfer the gyro samples to the processing unit. In some embodiments, the gyros can output a signed 16-bit pitch and yaw angular rate calibrated in units of degree per second (deg/sec). The amount of noise on the gyro output determines the smallest angular velocity change that can be resolved. The gyro sensitivity determines the minimum angular velocity represented by 1 least significant bit (LSB) of the gyro output. Together, the gyro noise density and sensitivity specifications can play a significant role in obtaining the desired angular position accuracy to perform EIS correction.

The processing unit 216 is configured to receive the frame(s) captured by the image sensor and the motion data measured by the motion sensor 214, and to adjust the lines of each frame according to the measured motion data to generate a modified frame which corrects for non-linear motion about one or two axis and other motion. In some embodiments, the processing unit 216 generates the modified frame (or re-sampled frame) on a line-by-line basis by adjusting the uncorrected lines of a frame to produce corrected lines for a modified frame according to the measured motion data associated with each captured line (or subset of lines in a frame). In some embodiments, the processing unit 216 can perform a forward (or push) method and/or a backward (or pull method) to generate or re-sample the lines for the modified frame. The forward method can involve taking uncorrected data and moving it to the correct position in a corrected frame buffer, e.g., pushing uncorrected data to its appropriate position in the corrected data buffer. The backward method can involve taking a corrected buffer position, identifying (or finding) the line in the uncorrected buffer that has the same or equivalent position, and filling the corrected buffer position in the corrected buffer with image data associated with the identified line (e.g., for each position in the corrected buffer, the appropriate lines are pulled from the uncorrected buffer with the same effective position as the position to be filled in the corrected buffer). Either the backward or forward stabilization correction method can be used. Depending on the hardware design details, it may be advantageous to use one method for vertical correction and the other method for horizontal correction. Thus, a combination of the forward and backward methods can be used in a line based EIS implementation. It should be understood that a physical corrected frame buffer is not necessary to implement the EIS correction as described herein. Frame buffers are costly in many types of architectures and are generally minimized or eliminated if possible. For example, corrected lines can be cropped and output directly to the video output without passing through a frame buffer.

In the example of FIG. 2, the processing unit 216 includes sub-processing systems, such as a motion processing sub-system 220 to process and store motion data from the motion sensor 214, a frame processing subsystem 250 to process and store image data of each frame(s) and its lines captured by the image sensor 212, and a frame correction subsystem 270 to generate and output a modified frame which is corrected for non-linear motion and other motion using a line-based EIS correction technique.

The motion processing subsystem 220 is configured to perform functions and processes described herein as functional blocks, such as a multiplier 222 to calibrate motion data from the motion sensor 214, calibration 224 to provide a calibration factor for the motion sensor 214 (e.g., gyro calibration factor), average n samples 226 to reduce signal noise from the signals from the motion sensor 214, integrator 228 to produce an angular position in degrees, offset correction 230 to correct for an offset in the crop window position, multiplier 232 to account for the zoom amount when converting degrees of motion to pixels, zoom factor 234 to provide a zoom scale factor indicative of a zoom operation or position of the camera device, sample controller 236 to manage the storage of processed motion data for each line or subset of lines per frame, and sample buffer 238 to store the processed motion data for each line or subset of lines per frame.

The multiplier 222 is configured to calibrate motion data (e.g., gyro data) from the motion sensor 214. The motion data may have a certain percentage of error and may need a factory calibration procedure to determine a correction scale factor. This correction factor can be stored in non-volatile memory at calibration time and loaded into a register for the calibration 224, such as for example during hardware initialization. The multiplier 222 includes a multiplier for each axis measured by the motion sensor 214. In this example, there are 2 channels for the motion data path.

The average n samples 226 is configured to reduce the signal noise of the motion sensor 214 (e.g., the gyro signal noise). The motion sensor 214 (or the gyro) can be over-sampled and averaged to produce samples at the required sample rate. This feature can depend on whether the motion sensor 214 (e.g., the gyro) has a max sample rate higher than the sensor line frequency rate.

The integrator 228 is configured to integrate the motion data, e.g., the gyro angular velocity in deg/sec to produce an angular position value in degrees. In some embodiments, the integrator 228 can, for example, be implemented as a trapezoidal integrator using the following transfer function:

$$H(z)=(T/2)*(1+z^{-1})/(1-z^{-1})$$

which is a $1^{st}$ order Infinite Impulse Response (IIR) filter. Other types of integrators may be employed, including but not limited to a Simpson integrator or a Rectangular integrator, for integrating the motion data. A separate integrator is provided for each axis measured by the motion sensor 214.

The offset correction 230 is configured to keep the average position of the crop window in the center of the frame buffer. The offset correction 230 monitors the average center pixel value of the crop window (e.g., from a crop control unit 292 discussed further below) and adds or subtracts an input offset value to the integrator 228. If the average position of the crop window starts to move too far in one direction where it is near the edge of the frame buffer (e.g., satisfies or exceeds a threshold value or condition), the offset to the integrator 228 will cause the average position of the crop window to move back toward the center of the frame buffer. A second function of the offset correction 230 is to cause the integrator 228 to freeze whenever there is a tilt or pan operation. This will prevent the integrator 228 from tracking tilt/pan motion for the case of Pan/Tilt/Zoom (PTZ) cameras.

The multiplier 232 is a zoom factor multiplier. The number of degrees of angular position can represent a different quantity of pixels depending on the zoom position of the lens. To convert degrees of motion to pixels requires multiplying the number of degrees by a zoom scale factor provided through the zoom factor block 234. These values will vary from lens to lens and may need to be calibrated at manufacturing time. A table of specific zoom scale factors for each zoom position can be stored in a memory, such as a non-volatile memory at calibration time. During each lens zoom operation, the appropriate value from the table is loaded into the zoom scale factor register.

The sample buffer 238 (e.g., a gyro sample buffer) is configured to store the samples of the motion data (e.g., gyro samples), which is read out from the motion sensor 214 and processed. In some embodiments, the sample buffer 238 may be a circular buffer that is used to store the samples of motion data read during one frame which would ideally be the number of lines in a frame. If there is a limitation on the sample rate of the motion sensor 214, the number of lines per sample generally could be increased which may result in lower stabilization performance. For EIS correction, a position value (e.g., a gyro position value) from the motion sensor 214 is provided for each line. In a rolling shutter readout, the exposure time window for each subsequent line in the frame may be slightly delayed from the previous line; therefore, if the camera is in motion, the camera position is slightly different for each line in the frame. As will be described further below, the line position values stored in the sample buffer 238 will be used in subsequent blocks to correct the position of each line in order to stabilize the image and correct rolling shutter artifacts. The sample buffer 238 stores the X and Y samples of motion data (e.g., motion data associated with the pitch axis and the yaw axis) along with line identification information indicative of the line number or the like that the sample was taken.

The sample controller 236 (e.g., a gyro sample controller) is configured to manage the writing or storage of the samples of motion data (e.g., the gyro samples) in associated with the line identification information into a memory, such as the sample buffer 238. The sample controller 236 includes horizontal sync (Hsync) and vertical sync (Vsync) inputs which identify the beginning of each frame and the beginning of each line, respectively. These signals are used to determine the current line number and determine when to roll the buffer index back to the beginning.

The frame processing subsystem 250 is configured to process and store the frame(s) and its lines captured by the image sensor 212. The frame processing subsystem 250 includes functional blocks, such as a deserializer 252, and an IPIPE (or image pipeline) 254.

The deserializer 252 is configured to receive the frames captured by the image sensor 212 in a serial format and to convert the serial data into parallel data. The deserializer 252 can also detect the beginning of each frame and the beginning of each line, and generate vertical sync (Vsync) and horizontal sync (Hsync) signals that are used by the motion sensor sampling process in the subsystem 220, as previously discussed, to identify a start of each line and each frame, respectively The IPIPE or image pipeline block 254 is configured to perform image processing functions such as de-mosaic, white balance, tone mapping, and/or other standard image processing to produce a processed image. The input of the IPIPE is RAW image data and the output is processed image data. It is not necessary that the IPIPE block 254 is placed at this position; instead, the IPIPE block 254 can be located after the Crop Window block 294. In other words, the EIS correction as described herein could be performed either on RAW image data or on processed image data. The position of the IPIPE block can depend on various system design tradeoffs.

The frame buffer 218 can be used to hold the uncorrected lines of image or video data. Lines will be fetched from the frame buffer 218 that have a different vertical offset from the line being corrected. This vertical offset depends on the amount of motion sensor pitch (e.g., gyro pitch) that was sampled for the line being corrected. The frame buffer 218 does not need to be the size of a full frame. In some embodiments, the number of lines the frame buffer 218 may need to contain at least the difference between the number of lines in the full frame and the number of lines in the crop window.

The frame correction subsystem 270 is configured to generate and output a modified frame which is corrected for non-linear motion and other motion. The frame correction subsystem 270 includes functional blocks, such as a position shifter 272, line sample selector 274, phase correction 276, sub-pixel interpolator 290, crop control unit 292 and a crop window 294. In this example, the EIS implementation can adjust a line with a given position designated by the motion sensor 214 (e.g., gyros) to its corrected position.

The line sample selector 274 is configured to receive, as input, a desired line number which is used to select the two (2) nearest lines in the gyro sample buffer 238 with positions (including the vertical (Y) motion data) that match the position of the desired line. The line identification information indicative of the line numbers and motion data for these lines are then returned to the position shifter 272 and the sub-pixel interpolator 290.

The phase correction 276 provides a phase correction register value which is a signed value that is added to the desired line number. This offset provides an adjustment to allow synchronizing the motion data (e.g., gyro data) with the video data. The motion sensor 214 (e.g., gyros) have a phase delay that will contribute to timing mismatch. There may be other sources of mismatch that can be addressed with this phase correction.

The position shifter 272 is configured to perform the vertical and horizontal shifting to correct the image. For each line of the frame being corrected, the position shifter 272 sends a desired line number to the line sample selector 271 which returns the line numbers and motion data from the two (2) closest lines with positions matching the desired line. The line numbers from the line sample selector 274 are then used to fetch these lines of video data from the frame buffer 218. This effectively performs the vertical correction of the EIS. The pixels in each line are then shifted horizontally according to the horizontal motion data that was received from the line sample selector 274 performing the horizontal correction of the EIS. The resulting lines are then output to the sub-pixel interpolator 290.

The sub-pixel interpolator 290 is configured to provide sub-pixel resolution of the final correction. For each output line, the sub-pixel interpolator 290 receives the two (2) closest lines from the position shifter 272. These lines have already been corrected to line and pixel level accuracy. The sub-pixel interpolator 290 also receives the motion data for these lines which is position data with sub-pixel accuracy. The sub-pixel interpolator 290 then performs a bi-cubic upscale, shifts each pixel according to the residual fractional gyro position data, and then down scales back to the original resolution resulting in one interpolated line. This line is then output to the crop window 294. In some embodiments, the sub-pixel interpolator 290 may not be needed if the motion sensor is not able to resolve motion less than one (1) pixel.

The crop window 294 is configured to receive the lines of corrected data from the sub-pixel interpolator 290. These lines have been shifted horizontally and vertically in a pattern that may no longer be a rectangle. The crop window 294 selects a subset (e.g., a rectangular subset) of the input data and outputs the resulting cropped data. The location of the crop region is determined by the position of the center pixel of the uncorrected image. The crop window 294 monitors the motion data received from the line sample selector 274 to determine this position.

If the camera device moves a large amount, the crop region will move enough to reach the edge of the video data. The crop region is adjusted toward the center of the video data by sending a time averaged center pixel position from the crop control unit 292 to the offset correction 230 of the subsystem 220 which will inject an offset to the integrator 228 which in turn will cause the position of the uncorrected center pixel to be brought back toward the center of the video data.

Figure 3:
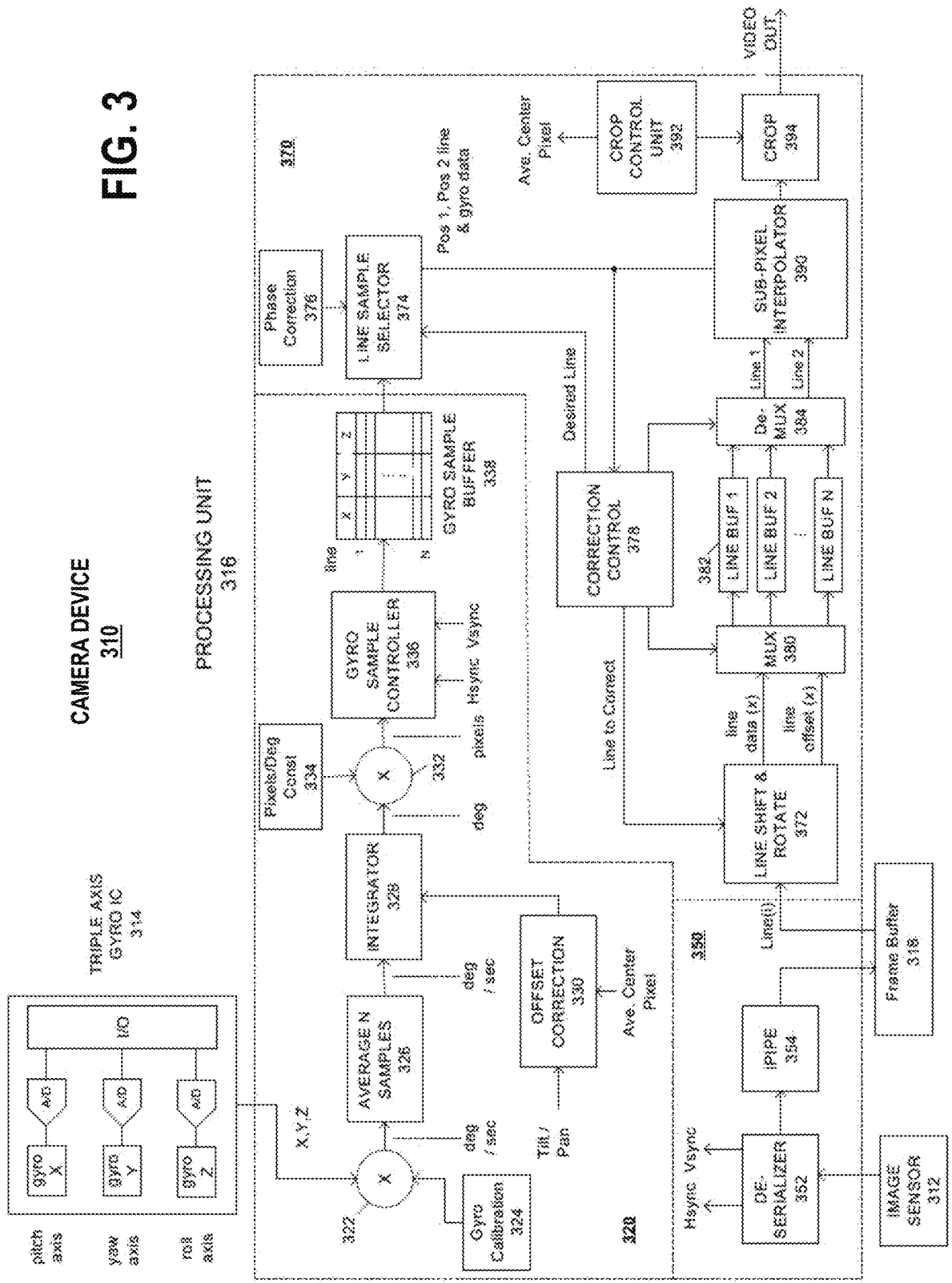
FIG. 3 shows a block diagram of example functional components of an electronic image stabilization system with at least three-axis motion correction for a camera device in accordance with an embodiment of the present disclosure.

FIG. 3 is a block diagram of example functional components of an electronic image stabilization (EIS) system with three-axis motion correction for a camera device 310 in accordance with an embodiment of the present disclosure. The camera device 310 includes an image sensor 312, a motion sensor 314, a processor unit(s) (or processor(s)) 316, and a frame buffer 318 and other buffers to store image data at various stages of the EIS correction processing.

The image sensor 312 is configured to capture frames of images, such as video frames of a video stream. In some embodiments, the image sensor 312 may be a CMOS image sensor, which utilizes a rolling shutter architecture to control the exposure, capture and readout of the lines of each frame. In some embodiments, the image sensor 312 can perform exposure and readout on a line-by-line basis or in subsets of lines-by-lines over time to produce a frame.

The motion sensor 314 is configured to measure non-linear motion of the camera device 210 and/or its components (e.g., lens, image sensor module, etc.). In some embodiments, the motion sensor 314 may be 3-axis gyro to measure and output motion data (or motion information) indicative of rotation about three axes, e.g., a pitch axis, a yaw axis and a roll axis. The motion sensor 314 can include a gyro to measure an angular velocity for each measurable axis, an analog-to-digital (A/D) converter to convert the motion data signal from the gyro to a digital motion data signal (or format), and a serial I/O interface to output the digital motion data signal into a serial data format.

In some embodiments, the motion sensor 314 may have gyros with performance characteristics sufficient to allow sampling a gyro reading during every line of a frame, and/or with integrated programmable high pass and low pass filters to control the bandwidth. One of the problems with gyros is that the output generally has an offset bias that may need to be corrected. However, since the absolute DC angular rate may not be important, the gyro output can be effectively AC coupled to ignore such DC offset bias. The integrated high pass filter can be set to a non-zero frequency, e.g., 0.5 Hz, to accomplish this goal. The gyro may have a number of registers that control the sensitivity range, high pass (HP) and low pass (LP) filters, interrupt configuration, first-in-first-out or FIFO configuration, and sample rate. The I/O bus between a gyro and the processing unit (e.g., a FPHA or DSP) can be used to setup these registers when the hardware is initialized. The I/O bus can also be used to transfer the gyro samples to the processing unit. In some embodiments, the gyros can output a signed 16-bit pitch, yaw and roll angular rate calibrated in units of degree per second (deg/sec). The amount of noise on the gyro output determines the smallest angular velocity change that can be resolved. The gyro sensitivity determines the minimum angular velocity represented by 1 LSB of the gyro output. Together, the gyro noise density and sensitivity specifications can play a significant role in obtaining the desired angular position accuracy to perform EIS correction.

The processing unit 316 is configured to receive the frame(s) captured by the image sensor and the motion data measured by the motion sensor 314, and to adjust the lines of each frame according to at least the measured motion data to generate a modified frame which corrects for non-linear motion about one, two or three axes and other motion. In some embodiments, the processing unit 316 generates the modified frame (or re-sampled frame) on a line-by-line basis by adjusting the uncorrected lines of a frame to produce corrected lines for a modified frame according to the measured motion data associated with each captured line (or subset of lines in a frame). In some embodiments, the processing unit 316 can perform a forward (or push) method and/or a backward (or pull method) to generate (or re-sample) the lines for the modified frame. The forward method involves taking uncorrected data and moving it to the correct position in a corrected frame buffer, e.g., pushing uncorrected data to its appropriate position in the corrected data buffer. The backward method involves taking a corrected buffer position, identifying at least one line in the uncorrected buffer that has the same or equivalent position, and filling the corrected buffer position in the corrected buffer using image data associated with the identified at least one line (e.g., for each position in the corrected buffer, the appropriate lines are pulled from the uncorrected buffer with the same effective position as the position to be filled in the corrected buffer). Either the backward or forward stabilization correction method can be used. Depending on the hardware design details, it may be advantageous to use one method for vertical correction and the other method for horizontal correction. Thus, a combination of the forward and backward methods can be used to correct for a combination of different types of non-linear motion. It should be understood that a physical corrected frame buffer is not necessary to implement the EIS correction as described herein. Frame buffers are costly in many types of architectures and are generally minimized or eliminated if possible. For example, corrected lines can be cropped and output directly to the video output without passing through a frame buffer.

In the example of FIG. 3, the processing unit 316 includes sub-processing systems, such as a motion processing subsystem 320 to process and store motion data from the motion sensor 314, a frame processing subsystem 350 to process and store image data of each frame(s) and its lines captured by the image sensor 312, and a frame correction subsystem 370 to generate and output a modified frame which is corrected for non-linear motion and other motion using a line-based EIS correction technique.

The motion processing subsystem 320 are configured to perform functions and processes described herein as functional blocks, such as a multiplier 322 to calibrate motion data from the motion sensor 314, calibration 324 to provide a calibration factor for the motion sensor 314 (e.g., gyro calibration factor), average n samples 326 to reduce signal noise from the signals from the motion sensor 314, integrator 328 to produce an angular position in degrees, offset correction 330 to correct for offset in the crop window position, multiplier 332 to account for the zoom amount when converting degrees of motion to pixels, zoom factor 334 to provide a zoom scale factor indicative of a zoom operation or position of the camera device, sample controller 336 to manage the storage of processed motion data for the each line or subset of lines per frame, and sample buffer 338 to store the processed motion data for the each line or subset of lines per frame.

The multiplier 322 is configured to calibrate motion data (e.g., gyro data) from the motion sensor 314. The motion data may have a certain percentage of error and may need a factory calibration procedure to determine a correction scale factor. This correction factor can be stored in non-volatile memory at calibration time and loaded into a register for the calibration 324, such as for example during hardware initialization. The multiplier 322 includes a multiplier for each axis measured by the motion sensor 314. In this example, there are 3 channels for the motion data path.

The average n samples 326 is configured to reduce the signal noise of the motion sensor 314 (e.g., the gyro signal noise). The motion sensor 314 (or the gyro) can be over-sampled and averaged to produce samples at the required sample rate. This feature can depend on whether the motion sensor 314 (or gyro) has a max sample rate higher than the sensor line frequency rate.

The integrator 328 is configured to integrate the motion data, e.g., the gyro angular velocity in deg/sec to produce an angular position value in degrees. In some embodiments, the integrator 328 can, for example, be implemented as a trapezoidal integrator using the following transfer function:

$$H(z)=(T/2)*(1+z^{-1})/(1-z^{-1})$$

which is a $1^{st}$ order Infinite Impulse Response (IIR) filter Other types of integrators may be employed, including but not limited to a Simpson integrator or a Rectangular integrator, for integrating the motion data. A separate integrator is provided for each axis measured by the motion sensor 314.

The offset correction 330 is configured to keep the average position of the crop window in the center of the frame buffer. The offset correction 330 monitors the average center pixel value of the crop window (e.g., from a crop control unit 392 discussed further below) and adds or subtracts an input offset value to the integrator 328. If the average position of the crop window starts to move too far in one direction where it is near the edge of the frame buffer (e.g., satisfies or exceeds a threshold value or condition), the offset to the integrator 328 will cause the average position of the crop window to move back toward the center of the frame buffer. A second function of the offset correction 330 is to cause the integrator 328 to freeze whenever there is a tilt or pan operation. This will prevent the integrator 328 from tracking tilt/pan motion for the case of Pan/Tilt/Zoom (PTZ) cameras.

The multiplier 332 is a zoom factor multiplier. The number of degrees can represent a different quantity of pixels depending on the zoom position of the lens. To convert degrees of motion to pixels requires multiplying the number of degrees by a zoom scale factor provided through the zoom factor block 334. These values will vary from lens to lens and may need to be calibrated at manufacturing time. A table of specific zoom scale factors for each zoom position can be stored in a memory, such as a non-volatile memory at calibration time. During each lens zoom operation, the appropriate value from the table is loaded into the zoom scale factor register.

The sample buffer 338 (e.g., a gyro sample buffer) is configured to store the samples of the motion data (e.g., gyro samples), which is read out from the motion sensor 314 and processed. In some embodiments, the sample buffer 338 may be a circular buffer that is used to store the samples of motion data read during one frame which would ideally be the number of lines in a frame. If there is a limitation on the sample rate of the motion sensor 314, the number of lines per sample generally could be increased which may result in lower stabilization performance. For EIS correction, a position value (e.g., a gyro position value) from the motion sensor 314 is provided for each line. In a rolling shutter readout, the exposure time window for each subsequent line in the frame may be slightly delayed from the previous line; therefore, if the camera is in motion, the camera position is slightly different for each line in the frame. As will be described further below, the line position values stored in the sample buffer 338 will be used in subsequent blocks to correct the position of each line in order to stabilize the image and correct rolling shutter artifacts. The sample buffer 236 stores the X, Y and Z samples of motion data (e.g., motion data associated with the pitch axis, the yaw axis, and the roll axis) along with line identification information indicative of the line number or the like that the sample was taken.

The sample controller 336 (e.g., a gyro sample controller) is configured to manage the writing or storage of the samples of motion data (e.g., the gyro samples) in associated with the line identification information into a memory, such as the sample buffer 338. The sample controller 336 includes horizontal sync (Hsync) and vertical sync (Vsync) inputs which identify the beginning of each frame and the beginning of each line, respectively. These signals are used to determine the current line number and to determine when to roll the buffer index back to the beginning.

The frame processing subsystem 350 is configured to process and store frame(s) and its lines captured by the image sensor 312. The frame processing subsystem 350 includes functional blocks, such as a deserializer 352, and an IPIPE (or image pipeline) 354.

The deserializer 352 is configured to receive the frames captured by the image sensor 312 in a serial format and to convert the serial data into parallel data. The deserializer 352 can also detect the beginning of each frame and the beginning of each line, and generate vertical sync (Vsync) and horizontal sync (Hsync) signals that are used by the motion sensor sampling process in the subsystem 320, as previously discussed, to identify a start of a new line or new frame.

The IPIPE or image pipeline block 354 is configured to perform image processing functions such as de-mosaic, white balance, tone mapping, and other standard image processing to produce a processed image. The input of the IPIPE is RAW image data and the output is processed image data. It is not necessary that the IPIPE block 354 be placed at this position; instead, the IPIPE block 354 can be after the Crop Window block 394 (discussed further below). In other words, the EIS correction could be performed either on RAW image data or on processed image data. The position of the IPIPE block depends on various system design tradeoffs.

The frame buffer 318 can be used to hold the uncorrected lines of image or video data. Lines will be fetched from the frame buffer 318 that have a different vertical offset from the line being corrected. This vertical offset depends on the amount of motion sensor pitch (e.g., gyro pitch) that was sampled for the line being corrected. The frame buffer 318 does not need to be the size of a full frame. In some embodiments, the number of lines the frame buffer 318 may need to contain at least the difference between the number of lines in the full frame and the number of lines in the crop window.

The frame correction subsystem 370 is configured to generate and output a modified frame which is corrected for non-linear motion and other motion. The frame correction subsystem 370 includes functional blocks, such as a line shift and rotate 372, line sample selector 374, phase correction 376, multiplexer (MUX) 380, line buffers 282 (e.g., from 1 to N), demultiplexer (DEMUX) 384, sub-pixel interpolator 390, crop control unit 392 and a crop window 394. In this example, the EIS implementation can adjust a line with a given position designated by the motion sensor 314 (e.g., gyros) to its corrected position.

The line sample selector 374 is configured to receive as input a desired line number which is used to select the two (2) nearest lines in the sample buffer 338 with positions (including the vertical (Y) motion data) that match the position of the desired line. The line numbers and motion data for these lines are then returned to the correction control 378. If either of the 2 nearest lines are not in the sample buffer 338 due to under sampling, the motion data for these lines can be interpolated from lines that are in the sample buffer 338.

The phase correction 376 provides a phase correction register value which is a signed value that is added to the desired line number. This offset provides an adjustment to allow synchronizing the motion data (e.g., gyro data) with the video data. The motion sensor 314 (e.g., gyros) can have a phase delay that will contribute to timing mismatch. There may be other sources of mismatch that can be addressed with this phase correction.

The line shift and rotate 372, in combination with other blocks of the subsystem 370 (e.g., correction control, 378, MUX 380, line buffers 382 and DeMUX 384), are configured to perform the vertical and horizontal shifting plus line rotation to correct the image. These adjustment operations can be broken down into three processes for the purposes of explanation: vertical shift, horizontal shift and rotation.

For the vertical shift process, the correction control block 378 is configured to send a desired line number to the line sample selector 374 which returns the line identification information indicative of line numbers and motion data from the two (2) closest lines with positions, for example, based on gyro pitch data (Y) that match the desired line position. From this line data, the correction control block 378 determines which frame buffer lines need to be corrected. For each line to be corrected, the line shift and rotate block 372 receives the line number to be corrected and fetches that line of video data from the frame buffer 318. This process of determining and obtaining the uncorrected line using motion data such as motion sensor position data (e.g., gyro position data) that matches the corrected line position effectively performs the vertical correction of the EIS.

For the horizontal shift process, the line shift and rotate block 372 shifts the pixels in each line horizontally according to the horizontal motion data that was received from the correction control block 378. This effectively performs the horizontal correction portion of the EIS.

For the rotation process, a purpose of this portion is to place the video data of each uncorrected line into its corrected position in the corrected frame. In the case of rotation, the correction may not be a simple matter of shifting lines vertically or pixels horizontally, but it may involve mapping the uncorrected line data across multiple lines in the corrected frame. For example, the roll of the line will be considered as a rotation about the center pixel of the line. The slope of the line is determined from the roll motion data (e.g., roll gyro data) for that line. For each pixel in the line, the amount of vertical offset of that pixel from horizontal is calculated from the slope and pixel position. The line pixel data and corresponding vertical offset for each pixel is output to a MUX block 380 that selects the appropriate line in a series of line buffers 382 that each pixel of the line should be written to. In this way, an uncorrected line with rotation is transposed or mapped across multiple lines in a series of corrected lines. It may take multiple uncorrected lines to fill one line in the series of corrected line buffers (or corrected buffer) 382. The correction control 378 determines how many and which uncorrected lines will need to be processed to fill in a complete line of corrected image data. The resulting lines are then output to the sub-pixel interpolator through a DeMUX block 384 which selects the two (2) lines nearest to the desired line.

As successive corrected lines are required, additional uncorrected lines are processed and added to the series of line buffers 382 until the required line of corrected data is filled. The number (N) of line buffers 382 may depend on the maximum rotation to be corrected. Once the last line of the line buffers 382 is used, processing may rollover back to the first line of the line buffers 382.

The correction control 378 is configured to coordinate the process of determining which lines need to be processed from the uncorrected frame buffer, placing rotated line data into the series of line buffers and transferring the completed lines to the sub-pixel interpolator 390.

The sub-pixel interpolator 390 is configured to provide sub-pixel resolution of the final correction. The vertical line shift and horizontal pixel shift performed in the line shift and rotate block 372 provided pixel level resolution and accuracy. For each pixel, there is a fractional remainder of vertical and horizontal correction that may not have been done. This block takes the two (2) nearest lines and interpolates them together with sub-pixel accuracy to accomplish the fractional remainder of correction.

For each output line, the sub-pixel interpolator 390 receives the two (2) closest lines from the series of line buffers 382. These lines have already been corrected to line and pixel level accuracy. The sub-pixel interpolator 390 also receives the motion data for these lines which provides the fractional remainder of correction to be performed. The sub-pixel interpolator 390 then performs a bi-cubic upscale, shifts each pixel according to the residual fractional gyro position data, and then down scales back to the original resolution resulting in one interpolated line. This line is then output to the crop window block 394. In some embodiments, the sub-pixel interpolator block 390 may not be needed if the motion sensor is not able to resolve motion less than one (1) pixel.

The crop window 394 is configured to receive the lines of corrected data from the sub-pixel interpolator 390. These lines have been shifted horizontally and vertically in a pattern that may no longer be a rectangle. The crop window 394 selects a subset (e.g., a rectangular subset) of the input data and outputs the resulting cropped data. The location of the crop region is determined by the position of the center pixel of the uncorrected image. The crop window 394 monitors the motion data received from the line sample selector 374 to determine this position.

If the camera device moves a large amount, the crop region will move enough to reach the edge of the video data. The crop region is adjusted toward the center of the video data by sending a time averaged center pixel position from the crop control unit 392 to the offset correction 330 of the subsystem 320 which will inject an offset to the integrator 328 which in turn will cause the position of the uncorrected center pixel to be brought back toward the center of the video data.

Figure 4:
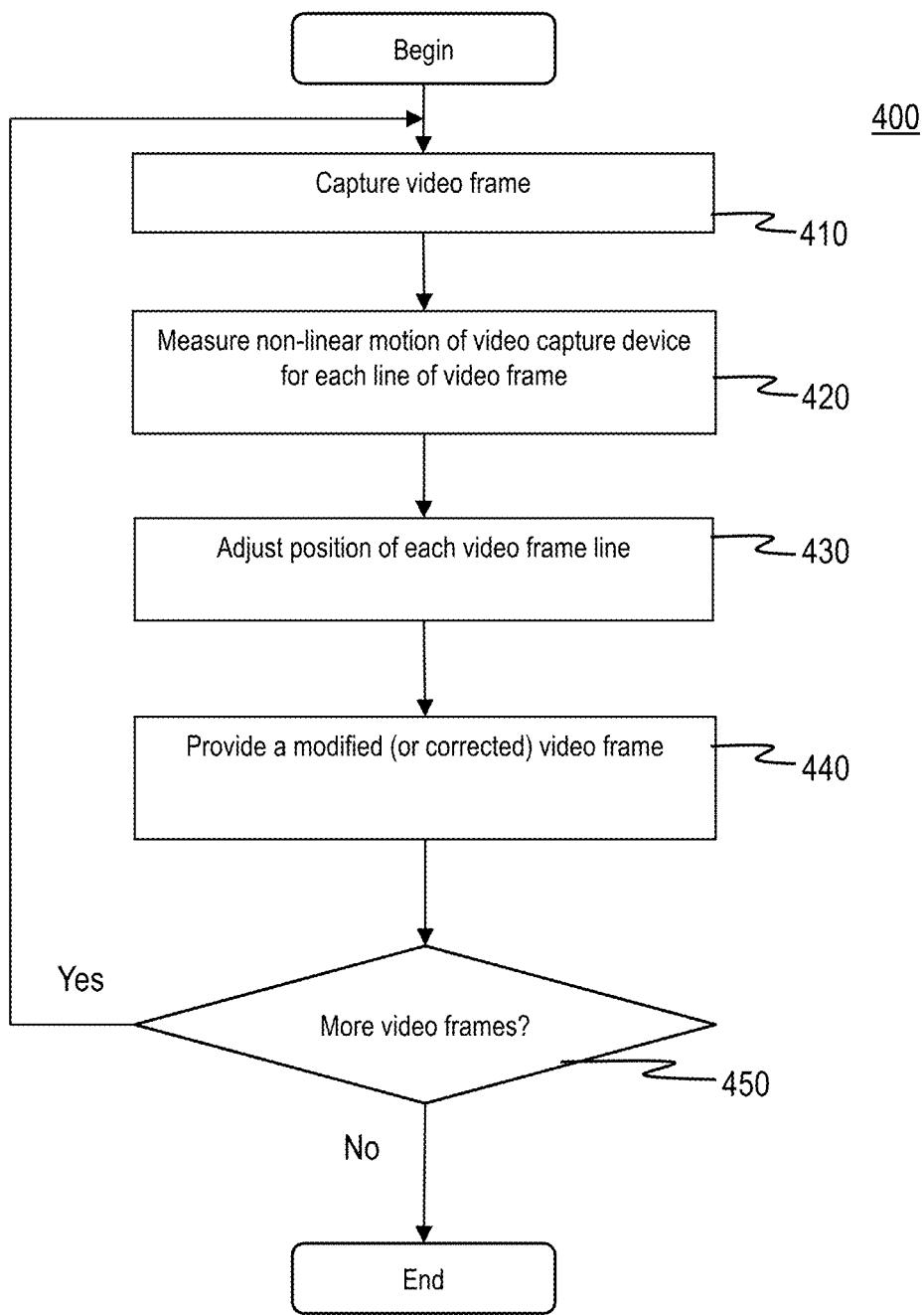
FIG. 4 shows a flowchart illustrating an example method of performing electronic image stabilization to correct for non-linear motion of a camera device in accordance with an embodiment of the present disclosure.

FIG. 4 is a flowchart illustrating an example method 400 of performing electronic image stabilization to correct for at least non-linear motion of a camera device in accordance with an embodiment of the present disclosure. For the purposes of explanation, the method 400 may be performed by the components of a camera device, which can include an image sensor(s), processor(s), motion sensor(s) and memory.

At block 410, video frame is captured by the image sensor(s) of the camera device. In some embodiments, the video frame is captured using a rolling shutter or the like.

At block 420, non-linear motion of the camera device is measured by the motion sensor(s) for each line of video frame to produce motion data indicative of the sensed motion. In some embodiments, the motion sensor(s) can include one or more gyros to measure motion on multiple axes, such as a pitch axis, yaw axis and/or roll axis.

At block 430, the position of each video frame line is adjusted by the processor(s) of the camera device to produce a modified (or corrected) video frame. In some embodiments, the lines may be adjusted using a forward (or push) method and/or a backward (or pull method) to generate (or correct) the lines for the modified frame based at least on the motion data. As previously described, the forward method can involve taking uncorrected data and moving it to the correct position in a corrected frame buffer, e.g., pushing uncorrected data to its appropriate position in the corrected data buffer. The backward method can involve taking a corrected buffer position, identifying (or finding) at least one line in the uncorrected buffer that has the same or equivalent position, and filling the corrected buffer position in the corrected buffer using image data of the identified at least one line (e.g., for each position in the corrected buffer, the appropriate lines are pulled from the uncorrected buffer with the same effective position as the position to be filled in the corrected buffer). In some embodiments, line interpolation may be used to provide sub-pixel resolution of the final correction. The modified frame may also be cropped according to a crop region controlled by a crop window.

At block 440, the modified video frame is provided (or output) by the processor(s) of the camera device. In some embodiments, the modified video frame is outputted from the camera device to a video management system (VMS).

At block 450, a determination is made whether there are more video frames to process for EIS correction of non-linear motion. If so, the method 400 performs the functions of blocks 410 to 440 for the next video frame.

Figure 5:
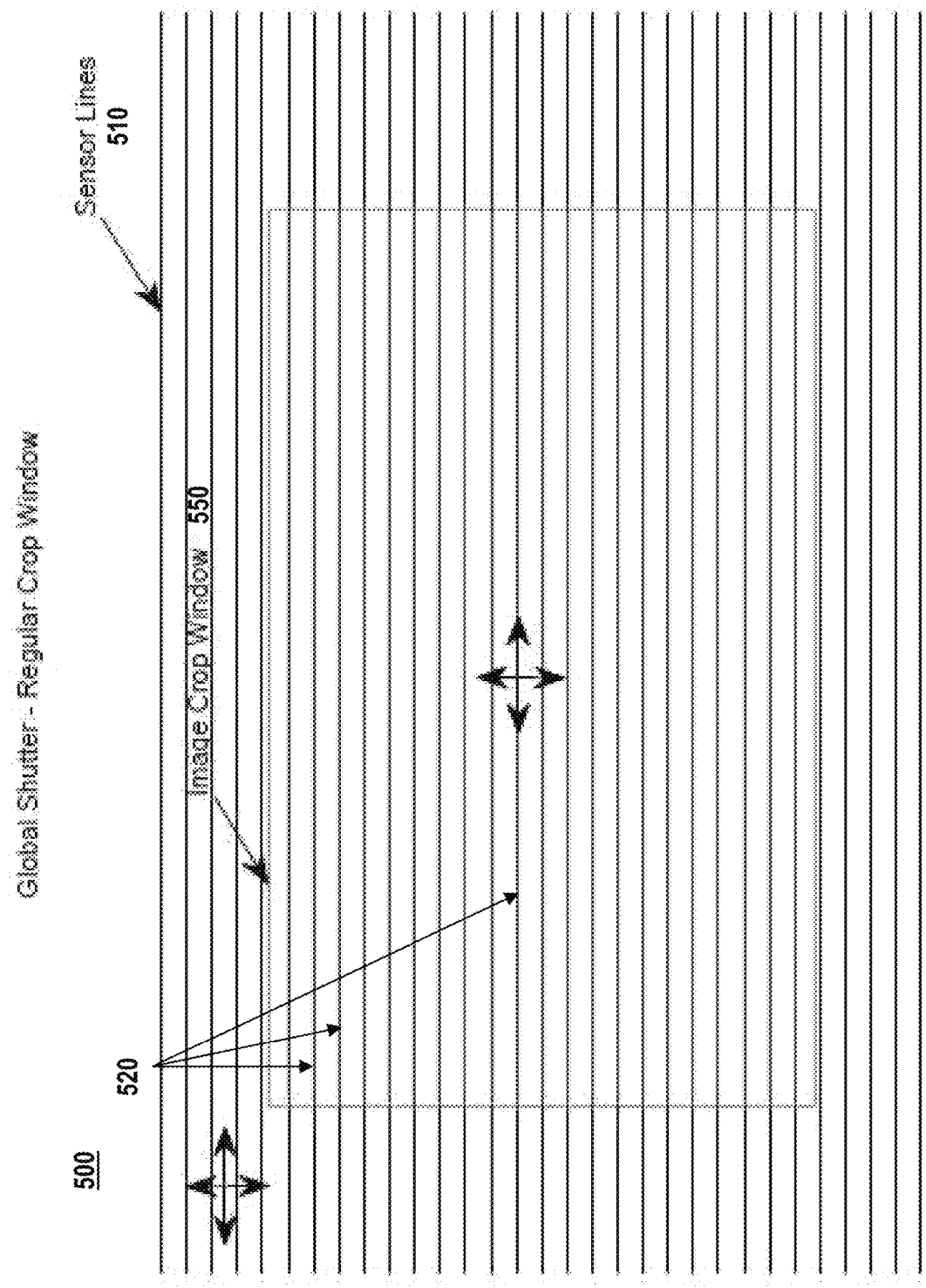
FIG. 5 shows an example scene space of lines of a frame captured using a global shutter by an image sensor of a camera device and cropped using a Regular Crop window.

FIG. 5 shows an example scene space 500 of lines 510 of a frame which is captured by image sensor(s), such as a charged coupled device(s) or CCD(s), of a camera device and cropped using a Regular Crop window 550 overlaid on the lines 510. The lines 510 depicted on the scene space 500 illustrate where each line of the image data originated in the scene. The CCD image sensors use a global shutter sensor, and a Regular Crop window readout which causes the exposure start and stop times to be the same for all lines. Because of this, any camera movement relative to the scene will cause the same amount of motion to be observed during the exposure of each of the sensor lines. When scene motion occurs due to camera movement, this motion is detected by motion sensors (e.g., gyro sensors) and the crop window position is adjusted to compensate for the camera motion. In this method, only one gyro reading per axis is needed per frame to perform image stabilization. The lines 520 (e.g., in the crop region of the crop window 550) show the resulting cropped lines that become the stabilized image. The cropping function is called a Regular Crop since it simply extracts a rectangular portion of image sensor lines. It is generally performed by reading a selected region out of a frame buffer or can be performed directly as the image is read through an image pipeline (or WIPE). This image stabilization method is also referred to as a global correction method since all the pixels in the image are corrected the same amount.

Figure 6:
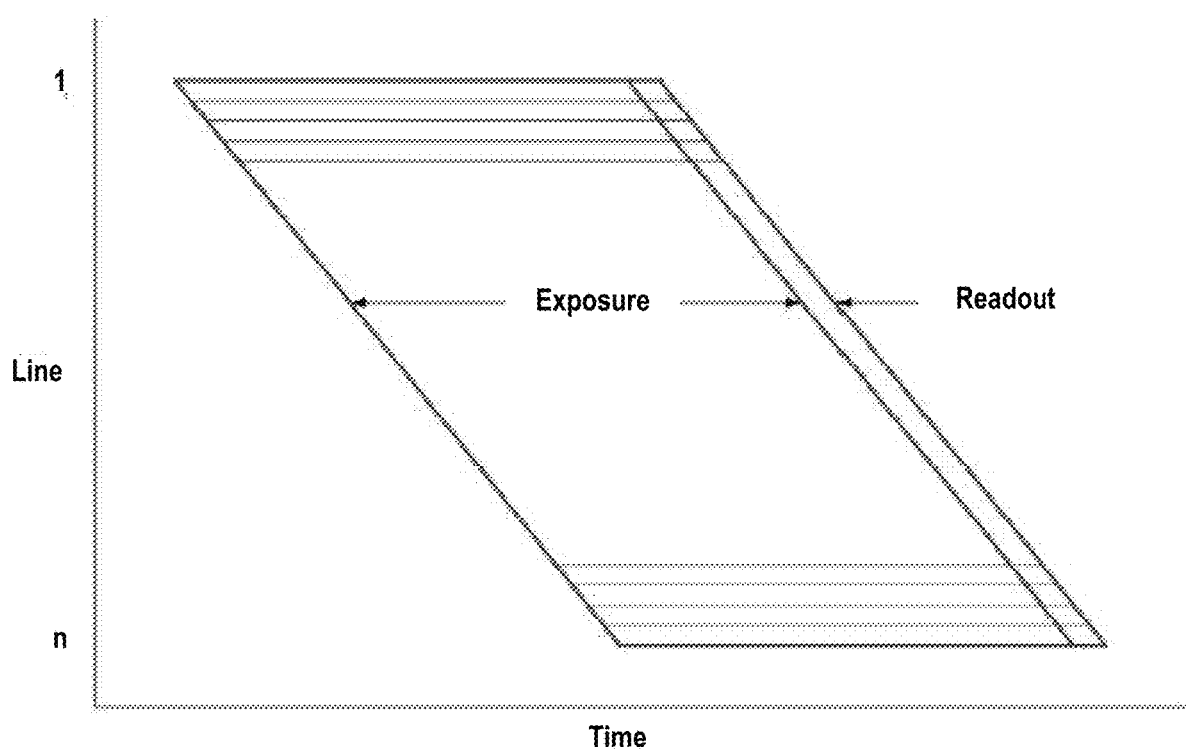
FIG. 6 shows an example of the image capture timing of a rolling shutter image sensor, such as a CMOS image sensor, used in a camera device to control exposure and readout time of the lines of a frame in accordance with an embodiment of the present disclosure.

FIG. 6 shows an example of the image capture timing of a rolling shutter image sensor, such as for example a CMOS image sensor, to control the exposure and readout timing of the lines of each frame. In FIG. 6, an example of a timing of a CMOS sensor rolling shutter operation is illustrated. On a still scene (e.g., a scene with no motion), this method has no effect on the image. If there is any motion, however, the fact that each successive line is exposed slightly later than the previous line causes various motion artifacts to appear in the resulting video frames. Various examples are shown in FIG. 7 and FIG. 8 of the effects of local camera motion during an image sensing operation of a frame by an image sensor employing a rolling shutter architecture (also referred herein as simply "rolling shutter").

Figure 7:
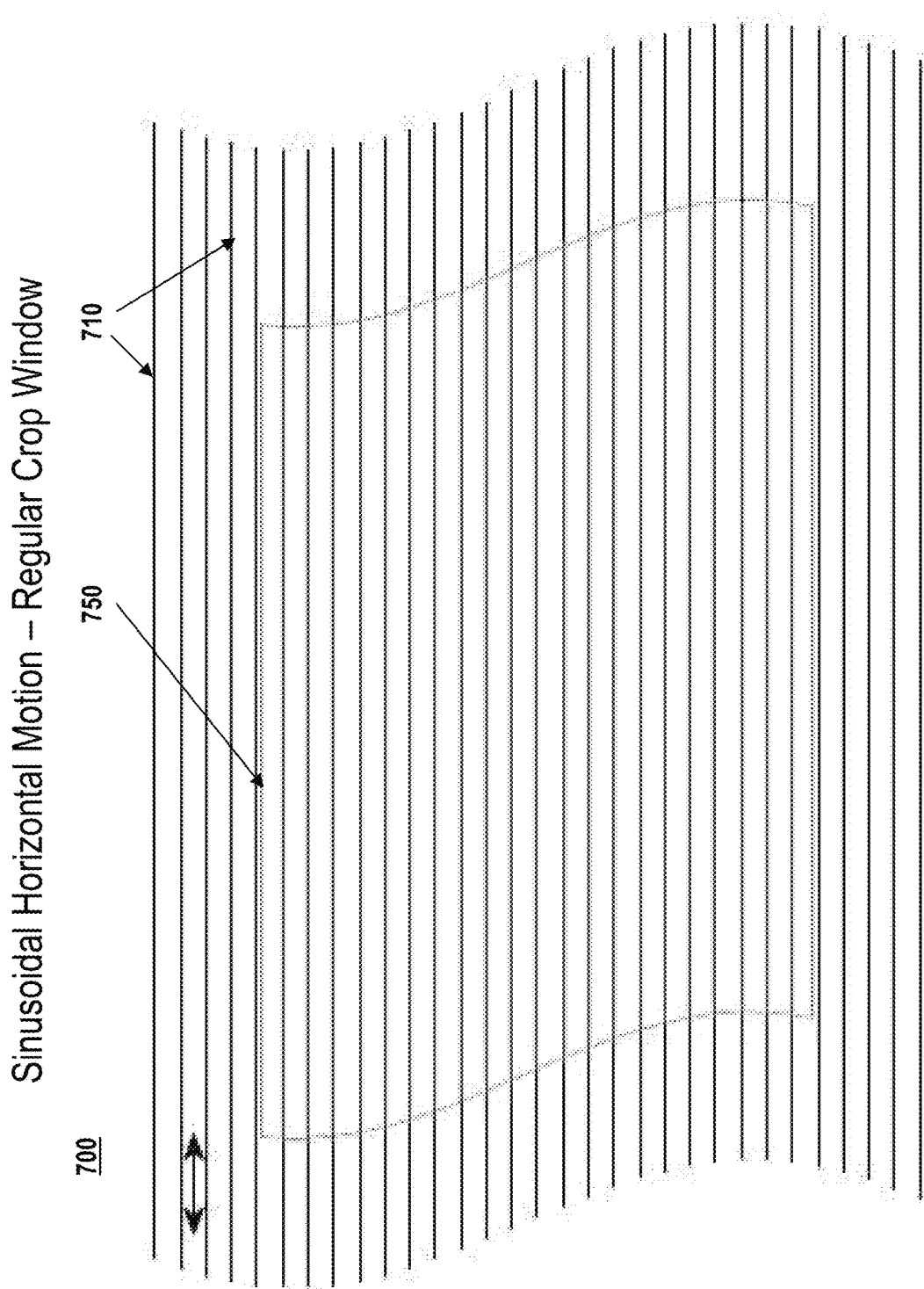
FIG. 7 shows an example scene space of lines of a frame (captured using a rolling shutter by an image sensor of a camera device), which contain artifacts induced by horizontal sinusoidal motion and are cropped using a Regular Crop window.

Referring to FIG. 7, an example scene space 700 is shown of lines 710 of a frame, which are captured by an image sensor (e.g., CMOS image sensor) using a rolling shutter on a camera device. In this example, the camera device is subjected to horizontal sinusoidal motion during the capture of one frame of the image sensor. As can be seen in FIG. 7, each line 710 captured by the image sensor has a different horizontal registration in the scene space 700 due to the rolling shutter readout resulting in horizontal shearing in the image. If the regular crop method using a Regular Crop window 750 and image stabilization method are used as in the CCD Global Shutter case (e.g., in FIG. 5), the effective crop as projected in the scene space 750 will be the area shown enclosed in the crop region of the Window 750 (e.g., a rectangular crop region). Since this image stabilization method uses one gyro reading per frame, only the camera position at the center of the frame time is accurately known. Since all pixels are adjusted by the same amount, only the center of the image will be properly stabilized. The upper and lower lines of the image will not be stabilized.

Figure 8:
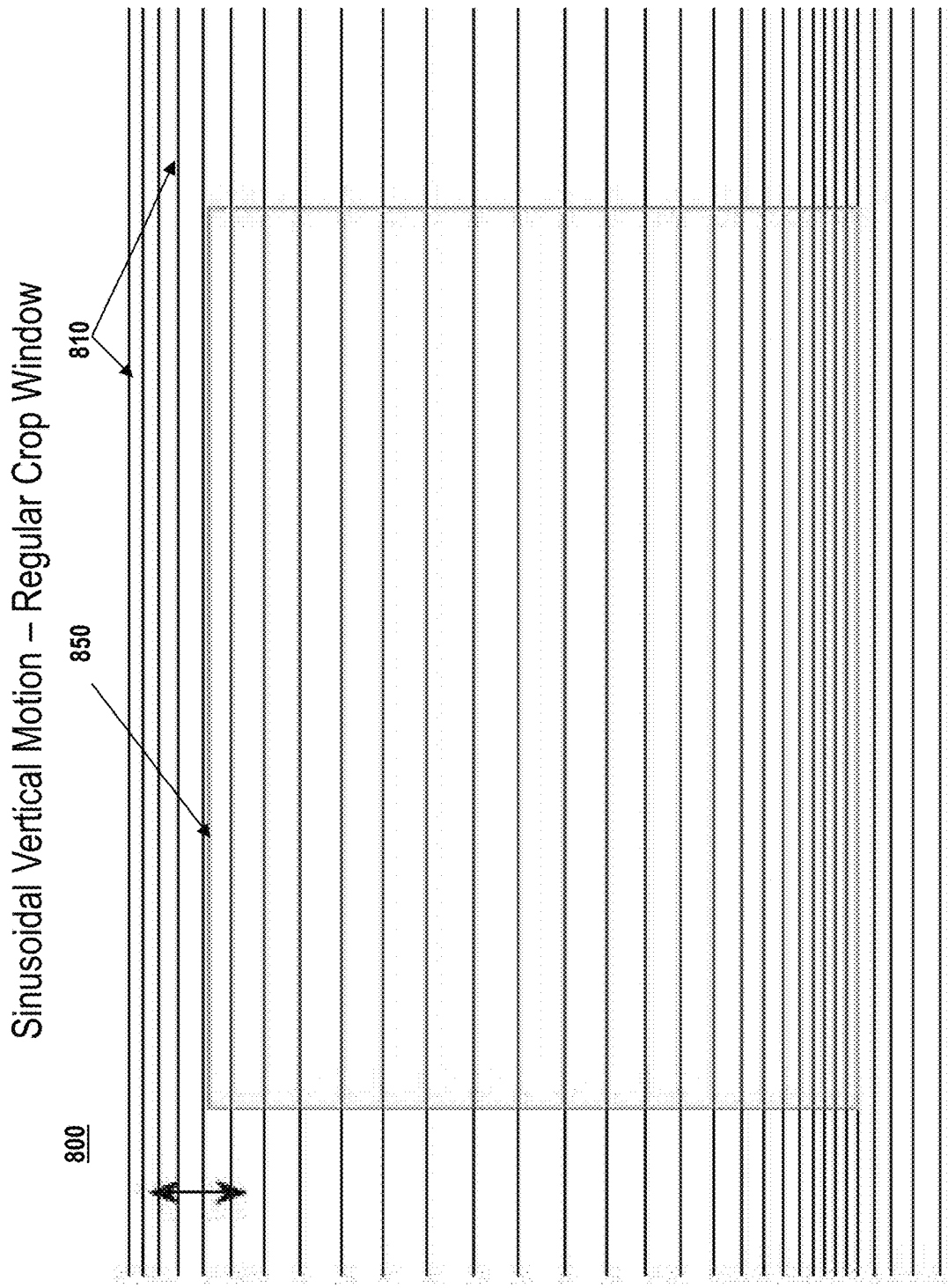
FIG. 8 shows an example scene space of lines of a frame (captured using a rolling shutter by an image sensor of a camera device), which contain artifacts induced by vertical sinusoidal motion and are cropped using a Regular Crop window.

FIG. 8 shows an example scene space 800 of lines 810 of a frame captured by an image sensor (e.g., a CMOS image sensor) using a rolling shutter on a camera device. In this example, the camera device is subjected to vertical sinusoidal motion and a Regular window 850 according to the present disclosure enabled. Similar to the horizontal motion case in FIG. 7, each line 810 in FIG. 8 has a different vertical registration in scene space due to the rolling shutter readout resulting in a compression and expansion of the image. Like the horizontal case, the effective crop window as projected in the scene space 800 will be the area shown as the crop region of a Regular Crop window 850 (e.g., a rectangular crop region), and only the center of the image will be stabilized when global correction image stabilization is used.

Figure 9:
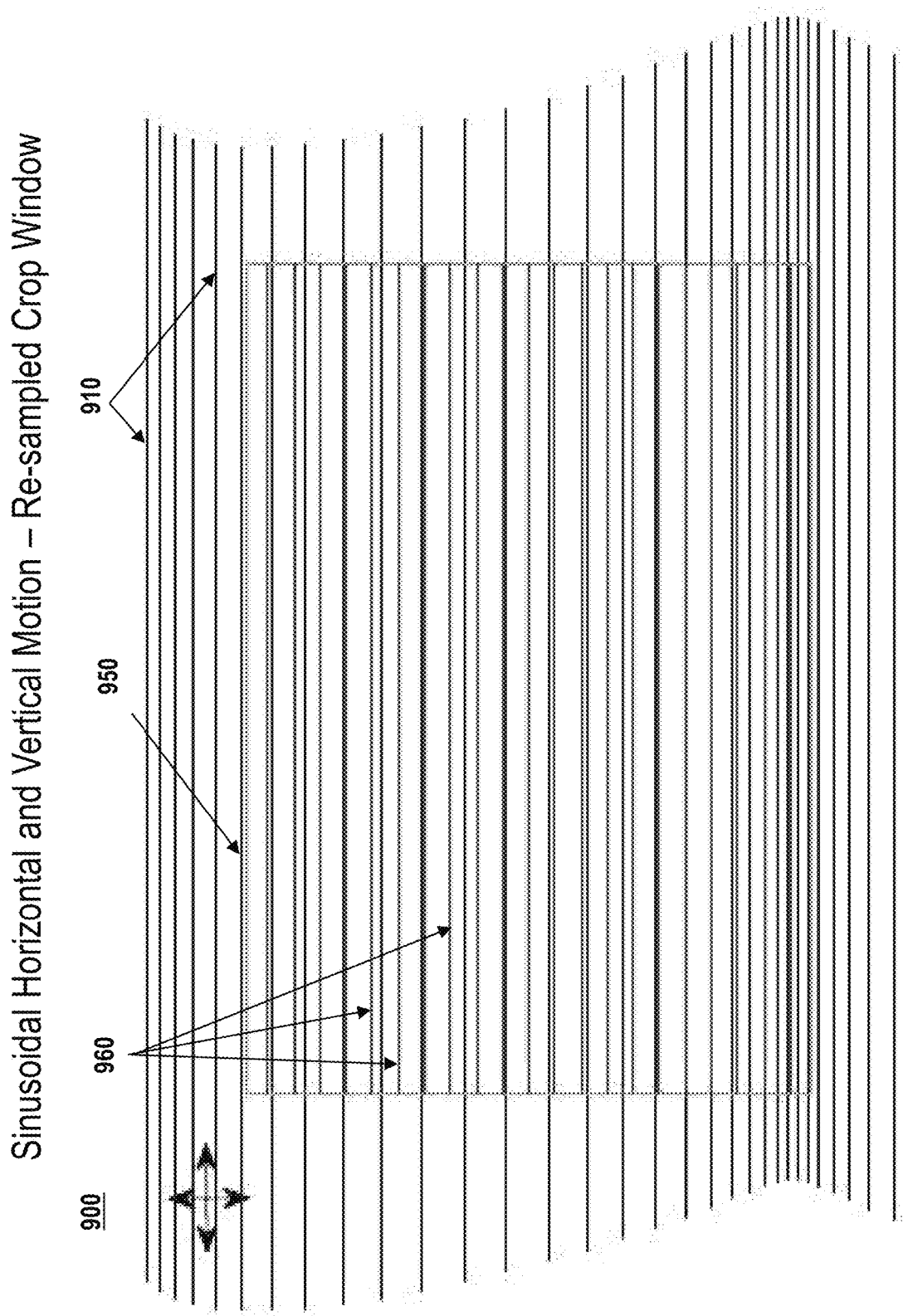
FIG. 9 shows an example scene space of lines of a frame, which is captured by an image sensor of a camera device using a rolling shutter architecture and corrected for artifacts induced by at least vertical and horizontal sinusoidal motion in accordance with an embodiment of the present disclosure.
Figure 10:
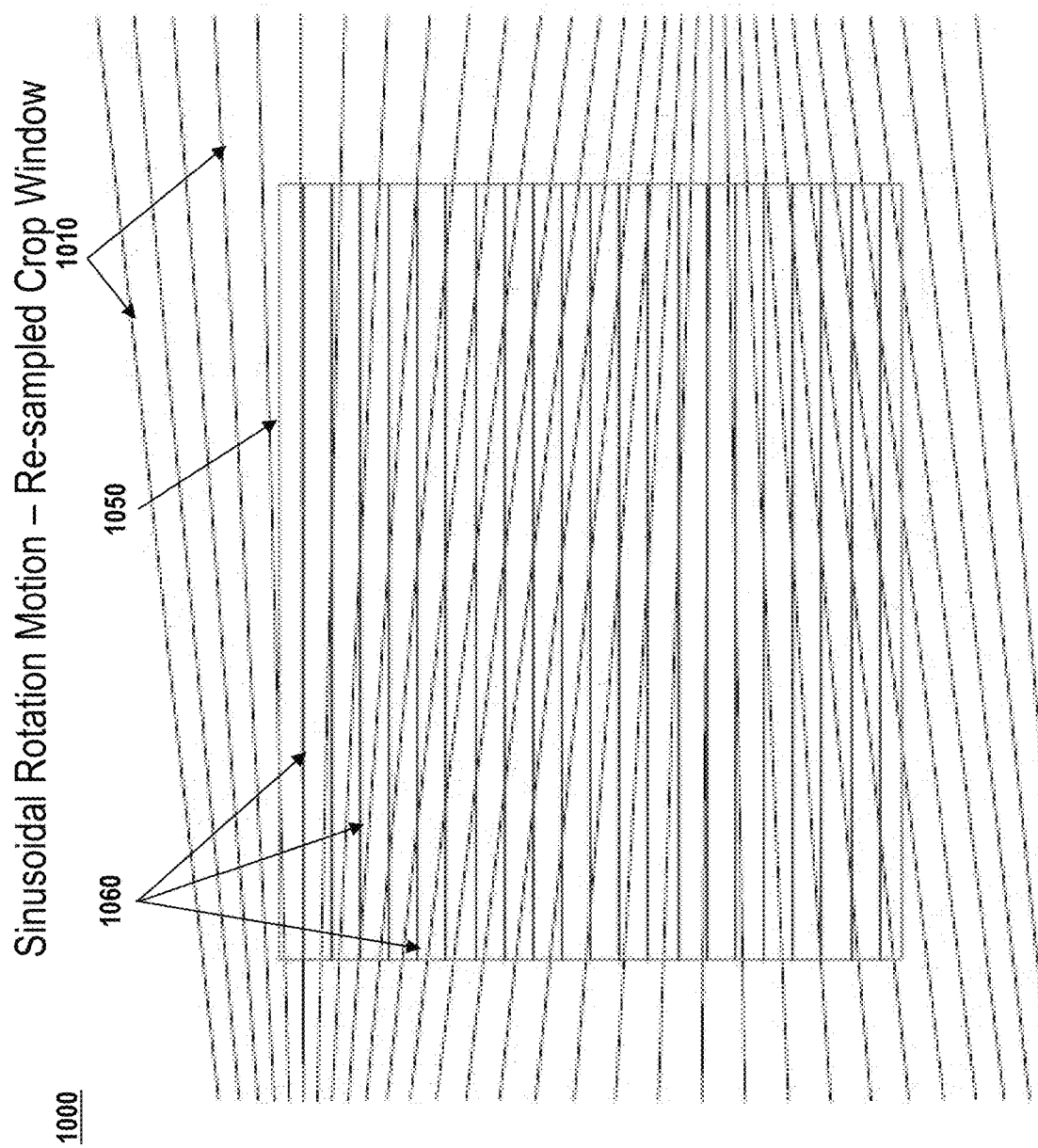
FIG. 10 shows an example scene space of lines of a frame, which is captured by an image sensor of a camera device using a rolling shutter architecture and corrected for artifacts induced by at least sinusoidal rotation motion in accordance with an embodiment of the present disclosure.

Referring to FIG. 9 and FIG. 10, there is provided two examples of a frame which have their lines corrected using the EIS method and system (as described herein) to address the effects of camera motion during a rolling shutter operation. FIG. 9 illustrates an example scene space 900 of a plurality of lines 910 of a frame captured and readout by an image sensor (e.g., a CMOS image sensor) using a rolling shutter on a camera device. In this example, the camera device is subjected to vertical and horizontal sinusoidal motion during the rolling shutter operation to capture and readout the frame. The captured lines 910 of the frame are projected onto the scene space 900 to show the vertical expansion/compression and the horizontal shearing that occurs in the lines 910 as a result of the camera motion. The EIS method and system, as described herein, can be employed to correct for camera motion when using a rolling shutter or similar shutter architecture. As previously explained, motion data (e.g., gyro sample) is obtained from the motion sensor during the exposure time of each line 910. In this way, the position of each line 910 in the scene space 900 can be determined. Instead of using a Regular Crop window and the same adjustment for each pixel (e.g., in FIG. 7 and FIG. 8), a new crop window 950 can be created and the image data can be resampled using the position information for each line 910 to obtain an image that is corrected for the local motion that occurred for each line 910. The lines 960 in the crop window 950 represent the re-sampled image data that is obtained by interpolating from the nearest capture lines after corrected for position.

FIG. 10 illustrates an example scene space 1000 of a plurality of lines 1010 of a frame, which is captured by an image sensor (e.g., a CMOS image sensor) using a rolling shutter on a camera device. In the example of FIG. 10, the camera device is subjected to local sinusoidal rotation motion during the rolling shutter operation to capture and readout the frame. A crop window 1050 shows a region of the frame which is cropped and outputted. This type of sinusoidal rotation motion can also be corrected using the EIS system and method, as described herein, with the use of motion data of pitch and yaw as well as roll measured by a motion sensor(s). In some embodiments, the motion sensor can be 3-axis gyro sensor (see, e.g., FIG. 3), which is sampled during the exposure time of each line 1010 from the image sensor. The captured image data in the crop window 1050 is re-sampled, and rotation position information from the motion sensor is used from each captured line 1010 to generate a modified frame with adjusted lines 1060 that is corrected for the local rotation motion. The lines 1060 in the crop window 1050 represent the re-sampled image data that is obtained by interpolating from the nearest capture lines after corrected for position.

Figure 11:
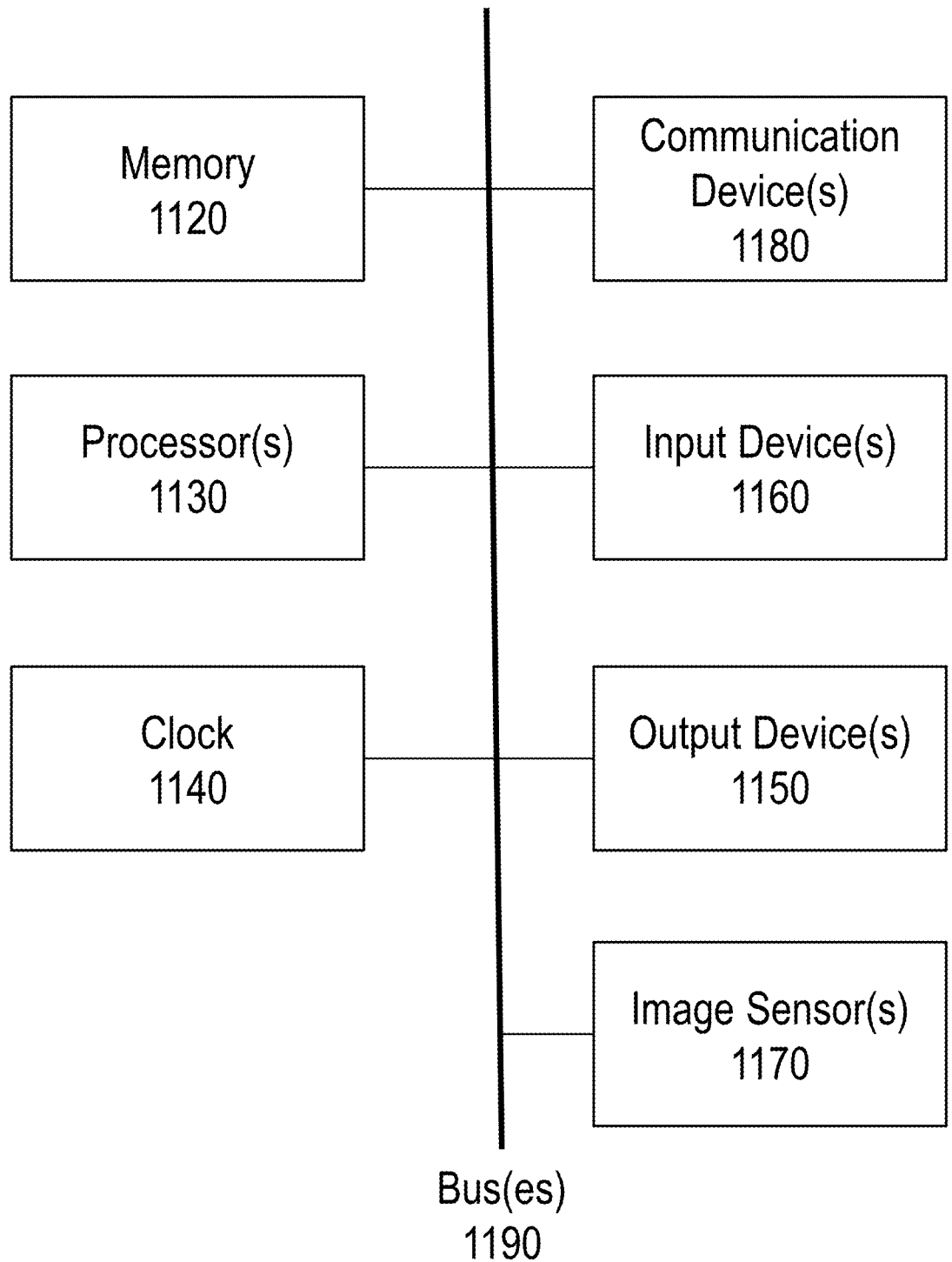
FIG. 11 shows an example of a computer device (or system) in accordance with an embodiment of the present disclosure.

FIG. 11 a block diagram of example components of a computer device (or system) 1100, in accordance with an exemplary embodiment of the present disclosure. As shown in FIG. 11, a computer device 1100 can include for example memory 1120, processor(s) 1130, clock 1140, output device 1150, input device 1160, image sensor(s) 1170, communication device 1180, and a bus system 1190 between the components of the computer device. The clock 1140 can be used to time-stamp data or an event with a time value.

The memory 1120 can store computer executable code, programs, software or instructions, which when executed by a processor, controls the operations of the computer device 1100, including the various processes described herein. The memory 1120 can also store other data used by the computer device 1100 or components thereof to perform the operations described herein. The other data can include but is not limited to images or video stream including image/video frames, motion data, correction parameters, thresholds or conditions, locations of the camera devices, tables and other data described herein.

The output device(s) 1150 can include a display device, printing device, speaker, lights (e.g., LEDs) and so forth. For example, the output device(s) 1150 may output for display or present a video stream(s) in one or more viewers, graphical user interface (GUI) or other data.

The input device(s) 1160 can include any user input device such as a mouse, trackball, microphone, touch screen, a joystick, control console, keyboard/pad, touch screen or other device operable by a user. The input device 1160 can be configured among other things to remotely control the operations of one or more camera devices or virtual cameras, such as pan, tilt and/or zoom operations. The input device(s) 1160 may also accept data from external sources, such other devices and systems.

The image sensor(s) 1170 can capture images or video stream, including but not limited to a wide view or a panoramic view. A lens system can also be included to change a viewing area to be captured by the image sensor(s). The image sensor 1170 can be a CMOS image sensor, which can utilize a rolling shutter architecture or similar architecture which can expose, capture and readout a line or subsets of lines of a frame at different times.

The processor(s) 1130, which interacts with the other components of the computer device, is configured to control or implement the various operations described herein. These operations can include video processing; performing EIS as described herein to correct for artifacts induced by non-linear and other motion; transmitting and receiving images or video frames of a video stream or other associated information; communicating with one or more camera devices; controlling or facilitating the control over the operations of one or more cameras devices or virtual cameras; or other operations described herein.

The above describes example components of a computer device such as for a computer, server, camera device or other data processing system or network node, which may communicate with one or more camera devices and/or other systems or components of video surveillance system over a network(s). The computer device may or may not include all of the components of FIG. 11, and may include other additional components to facilitate operation of the processes and features described herein. The computer device may be a distributed processing system, which includes a plurality of computer devices which can operate to perform the various processes and features described herein.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and may be given a different name or label. The use of the term "or" is not limited to exclusive "or", but may also mean "and/or". The use of the slash symbol "/" may mean "or" or "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

A processor(s) or controller(s) as described herein can be a processing system or unit, which can include one or more processors, such as CPU, GPU, controller, FPGA (Field Programmable Gate Array), digital signal processor (DSP), ASIC (Application-Specific Integrated Circuit) or other dedicated circuitry or other processing unit, which controls the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links. Video may be streamed using various protocols, such as for example HTTP (Hyper Text Transfer Protocol) or RTSP (Real Time Streaming Protocol) over an IP network. The video stream may be transmitted in various compression formats (e.g., JPEG, MPEG-4, etc.)

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the present disclosure describes specific examples, it is recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method of performing electronic image stabilization of images captured by an image sensor on a camera device, comprising: measuring non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame; and adjusting the position of each line of the frame based, at least in part, on the measured non-linear motion to create a modified frame that corrects for non-linear motion that occurred for each line of the frame; the measuring non-linear motion further comprising: generating motion data indicative of the measured non-linear motion for each line read from the image sensor for the frame; and storing the motion data in association with line identification information indicative of a line number or order in the frame for each line of the frame.

2. The method of claim 1, wherein the position of each line is adjusted to create the modified frame that corrects for non-linear motion including at least pitch and yaw motion.

3. The method of claim 1, wherein the position of each line is adjusted to create the modified frame that corrects for non-linear motion including at least pitch, yaw, and roll motion.

4. The method of claim 1, wherein the frame is one video frame of a video stream including a plurality of video frames, and the method is repeated until the method has been applied to each video frame of the plurality of video frames.

5. A method of performing electronic image stabilization of images captured by an image sensor on a camera device, comprising:
    measuring non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame;
    adjusting the position of each line of the frame based, at least in part, on the measured non-linear motion to create a modified frame that corrects for non-linear motion that occurred for each line of the frame;
    cropping a region of the modified frame according to a crop region defined by a crop window; and
    outputting image data for the cropped region of the modified frame.

6. The method of claim 5, further comprising:
    storing image data for a frame in a frame buffer;
    monitoring an average center pixel value of the crop window; and
    applying an offset value to the motion data for the lines of the frame in order to re-center the crop window relative to a center of the frame buffer when a position of the average center pixel value indicates that an edge of the crop window has moved closer to a position of an edge of the frame buffer.

7. The method of claim 5, wherein the position of each line is adjusted to create the modified frame that corrects for non-linear motion including at least pitch and yaw motion.

8. The method of claim 5, wherein the position of each line is adjusted to create the modified frame that corrects for non-linear motion including at least pitch, yaw, and roll motion.

9. The method of claim 5, wherein the frame is one video frame of a video stream including a plurality of video frames, and the method is repeated until the method has been applied to each video frame of the plurality of video frames.

10. A method of performing electronic image stabilization of images captured by an image sensor on a camera device, comprising:
    measuring non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame;
    storing image data of an uncorrected frame in a frame buffer; and
    adjusting the position of each line of the frame based, at least in part, on the measured non-linear motion to create a modified frame that corrects for non-linear motion that occurred for each line of the frame by taking uncorrected image data of the lines of the frame in the frame buffer and moving the uncorrected image data to a corrected position based on the motion data measured for the lines.

11. The method of claim 10, wherein the position of each line is adjusted to create the modified frame that corrects for non-linear motion including at least pitch and yaw motion.

12. The method of claim 10, wherein the position of each line is adjusted to create the modified frame that corrects for non-linear motion including at least pitch, yaw, and roll motion.

13. The method of claim 10, wherein the frame is one video frame of a video stream including a plurality of video frames, and the method is repeated until the method has been applied to each video frame of the plurality of video frames.

14. A method of performing electronic image stabilization of images captured by an image sensor on a camera device, comprising:
    measuring non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame;
    storing image data of an uncorrected frame in a frame buffer; and
    adjusting the position of each line of the frame based, at least in part, on the measured non-linear motion to create a modified frame that corrects for non-linear motion that occurred for each line of the frame by:
        selecting a corrected frame position,
        identifying at least one line from the frame that has the same or equivalent position from the uncorrected frame buffer based on the motion data measured for the lines of the frame, and
        filling the corrected frame position using image data associated with the identified at least one line.

15. The method of claim 14, wherein the position of each line is adjusted to create the modified frame that corrects for non-linear motion including at least pitch and yaw motion.

16. The method of claim 14, wherein the position of each line is adjusted to create the modified frame that corrects for non-linear motion including at least pitch, yaw, and roll motion.

17. The method of claim 14, wherein the frame is one video frame of a video stream including a plurality of video frames, and the method is repeated until the method has been applied to each video frame of the plurality of video frames.

18. A method of performing electronic image stabilization of images captured by an image sensor on a camera device, comprising:
    measuring non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame; and
    adjusting the position of each line of the frame based, at least in part, on the measured non-linear motion to create a modified frame that corrects for non-linear motion that occurred for each line of the frame, the adjusting the position including, for each line to be corrected from the captured frame:
obtaining line information of one or more line numbers and motion data of at least one closest line matching the line to be corrected;
fetching the at least one closest line from a frame buffer to perform vertical correction; and
shifting pixels in the at least one closest line to perform horizontal correction according to the motion data.

19. The method of claim 18, wherein the at least one closest line comprises two closest lines matching the line to be corrected, the adjusting the position further comprising interpolating the two closest lines with the shifted pixels to produce a single interpolated line for the modified frame.

20. The method of claim 18, wherein the position of each line is adjusted to create the modified frame that corrects for non-linear motion including at least pitch and yaw motion.

21. The method of claim 18, wherein the position of each line is adjusted to create the modified frame that corrects for non-linear motion including at least pitch, yaw, and roll motion.

22. The method of claim 18, wherein the frame is one video frame of a video stream including a plurality of video frames, and the method is repeated until the method has been applied to each video frame of the plurality of video frames.

23. A method of performing electronic image stabilization of images captured by an image sensor on a camera device, comprising:
measuring non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame; and
adjusting the position of each line of the frame based, at least in part, on the measured non-linear motion to create a modified frame that corrects for non-linear motion that occurred for each line of the frame by mapping image data of the line to be corrected on the frame across multiple lines in the modified frame to correct for rotational motion measured by the motion sensor.

24. The method of claim 23, wherein the position of each line is adjusted to create the modified frame that corrects for non-linear motion including at least pitch and yaw motion.

25. The method of claim 23, wherein the position of each line is adjusted to create the modified frame that corrects for non-linear motion including at least pitch, yaw, and roll motion.

26. The method of claim 23, wherein the frame is one video frame of a video stream including a plurality of video frames, and the method is repeated until the method has been applied to each video frame of the plurality of video frames.

27. A system for performing electronic image stabilization of images captured by an image sensor on a camera device, comprising:
a memory; and
one or more processors configured to:
measure non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame, the motion sensor being configured to generate motion data indicative of the measured non-linear motion for each line which is read from the image sensor for the frame;
adjust the position of each line of the frame based, at least in part, on the measured non-linear motion to create a modified frame that corrects for non-linear motion that occurred for each line of the frame; and
store in the memory the motion data in association with line identification information indicative of a line number or order in the frame for each line of the frame.

28. The system of claim 27, wherein the position of each line is adjusted to create the modified frame that corrects for non-linear motion including at least pitch and yaw motion.

29. The system of claim 27, wherein the position of each line is adjusted to create the modified frame that corrects for non-linear motion including at least pitch, yaw, and roll motion.

30. The system of claim 27, wherein the frame is one video frame of a video stream including a plurality of video frames, and the one or more processors are configured to repeat the measuring and adjusting operations on each video frame of the plurality of video frames.

31. A system for performing electronic image stabilization of images captured by an image sensor on a camera device, comprising:
a memory; and
one or more processors configured to:
measure non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame;
adjust the position of each line of the frame based, at least in part, on the measured non-linear motion to create a modified frame that corrects for non-linear motion that occurred for each line of the frame;
crop a region of the modified frame according to a crop region defined by a crop window; and
output image data for the cropped region of the modified frame.

32. The system of claim 31, wherein the one or more processors are further configured to:
Store image data for a frame in a frame buffer;
monitor an average center pixel value of the crop window; and
apply an offset value to the motion data for the lines of the frame in order to re-center the crop window relative to a center of the frame buffer when a position of the average center pixel value indicates that an edge of the crop window has moved closer to a position of an edge of the frame buffer.

33. The system of claim 31, wherein the position of each line is adjusted to create the modified frame that corrects for non-linear motion including at least pitch and yaw motion.

34. The system of claim 31, wherein the position of each line is adjusted to create the modified frame that corrects for non-linear motion including at least pitch, yaw, and roll motion.

35. The system of claim 31, wherein the frame is one video frame of a video stream including a plurality of video frames, and the one or more processors are configured to repeat the measuring and adjusting operations on each video frame of the plurality of video frames.

36. A system for performing electronic image stabilization of images captured by an image sensor on a camera device, comprising:
  a memory; and
  one or more processors configured to:
    measure non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame;
    store image data of an uncorrected frame in a frame buffer; and
    adjust the position of each line of the frame based, at least in part, on the measured non-linear motion to create a modified frame that corrects for non-linear motion that occurred for each line of the frame by taking uncorrected image data of the lines of the frame in the frame buffer and move the uncorrected image data to a corrected position based on the motion data measured for the lines.

37. The system of claim 36, wherein the position of each line is adjusted to create the modified frame that corrects for non-linear motion including at least pitch and yaw motion.

38. The system of claim 36, wherein the position of each line is adjusted to create the modified frame that corrects for non-linear motion including at least pitch, yaw, and roll motion.

39. The system of claim 36, wherein the frame is one video frame of a video stream including a plurality of video frames, and the one or more processors are configured to repeat the measuring and adjusting operations on each video frame of the plurality of video frames.

40. A system for performing electronic image stabilization of images captured by an image sensor on a camera device, comprising:
  a memory; and
  one or more processors configured to:
    measure non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame;
    store image data of an uncorrected frame in a frame buffer; and
    adjust the position of each line of the frame based, at least in part, on the measured non-linear motion to create a modified frame that corrects for non-linear motion that occurred for each line of the frame by further configuring the one or more processors to:
      select a corrected frame position,
      identify at least one line from the frame that has the same or equivalent position from the uncorrected frame buffer based on the motion data measured for the lines of the frame, and
      fill the corrected frame position using image data associated with the identified at least one line.

41. The system of claim 40, wherein the position of each line is adjusted to create the modified frame that corrects for non-linear motion including at least pitch and yaw motion.

42. The system of claim 40, wherein the position of each line is adjusted to create the modified frame that corrects for non-linear motion including at least pitch, yaw, and roll motion.

43. The system of claim 40, wherein the frame is one video frame of a video stream including a plurality of video frames, and the one or more processors are configured to repeat the measuring and adjusting operations on each video frame of the plurality of video frames.

44. A system for performing electronic image stabilization of images captured by an image sensor on a camera device, comprising:
  a memory; and
  one or more processors configured to:
    measure non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame; and
    adjust the position of each line of the frame based, at least in part, on the measured non-linear motion to create a modified frame that corrects for non-linear motion that occurred for each line of the frame by further configuring the one or more processors to, for each line to be corrected from the captured frame:
      obtain line information of one or more line numbers and motion data of at least one closest line matching the line to be corrected,
      fetch the at least one closest line from a frame buffer to perform vertical correction, and
      shift pixels in the at least one closest line to perform horizontal correction according to the motion data.

45. The system of claim 44, wherein the at least one closest line comprises two closest lines matching the line to be corrected, to adjust the position the one or more processors being further configured to interpolate the two closest lines with the shifted pixels to produce a single interpolated line for the modified frame.

46. The system of claim 44, wherein the position of each line is adjusted to create the modified frame that corrects for non-linear motion including at least pitch and yaw motion.

47. The system of claim 44, wherein the position of each line is adjusted to create the modified frame that corrects for non-linear motion including at least pitch, yaw, and roll motion.

48. The system of claim 44, wherein the frame is one video frame of a video stream including a plurality of video frames, and the one or more processors are configured to repeat the measuring and adjusting operations on each video frame of the plurality of video frames.

49. A system for performing electronic image stabilization of images captured by an image sensor on a camera device, comprising:
  a memory; and
  one or more processors configured to:
    measure non-linear motion of a camera device with a motion sensor during an exposure time for each line of a frame captured by the image sensor of the camera device, wherein a first line of the frame has a first exposure time, and subsequent lines of the frame have an exposure time that is later than a previous line of the frame, each line of the frame having an associated position in the frame; and adjust the position of each line of the frame based, at least in part, on the measured non-linear motion to create a modified frame that corrects for non-linear motion that occurred for each line of the frame by mapping image data of the line to be corrected on the frame across multiple lines in the modified frame to correct for rotational motion measured by the motion sensor.

50. The system of claim 49, wherein the position of each line is adjusted to create the modified frame that corrects for non-linear motion including at least pitch and yaw motion.

51. The system of claim 49, wherein the position of each line is adjusted to create the modified frame that corrects for non-linear motion including at least pitch, yaw, and roll motion.

52. The system of claim 49, wherein the frame is one video frame of a video stream including a plurality of video frames, and the one or more processors are configured to repeat the measuring and adjusting operations on each video frame of the plurality of video frames.

* * * * *